(12) United States Patent
Loccufier et al.

(10) Patent No.: US 8,344,038 B2
(45) Date of Patent: Jan. 1, 2013

(54) RADIATION CURABLE COMPOSITIONS FOR FOOD APPLICATIONS

(75) Inventors: Johan Loccufier, Zwijnaarde (BE); Roland Claes, Dendermonde (BE)

(73) Assignee: Agfa Graphics NV, Mortsel (BE)

( * ) Notice: Subject to any disclaimer, the term of this patent is extended or adjusted under 35 U.S.C. 154(b) by 384 days.

(21) Appl. No.: 12/675,812

(22) PCT Filed: Sep. 1, 2008

(86) PCT No.: PCT/EP2008/061484
§ 371 (c)(1),
(2), (4) Date: Mar. 1, 2010

(87) PCT Pub. No.: WO2009/030658
PCT Pub. Date: Mar. 12, 2009

(65) Prior Publication Data
US 2010/0304149 A1    Dec. 2, 2010

Related U.S. Application Data

(60) Provisional application No. 60/970,630, filed on Sep. 7, 2007.

(30) Foreign Application Priority Data

Sep. 4, 2007   (EP) ..................... 07115607

(51) Int. Cl.
*C08F 2/50* (2006.01)
*C08F 2/42* (2006.01)

(52) U.S. Cl. ............... 522/28; 522/7; 522/30; 522/57; 522/65; 427/256; 428/412; 428/423.1; 428/457; 428/473.5; 428/474.4; 428/480; 428/523

(58) Field of Classification Search ............ 522/904, 522/905

See application file for complete search history.

(56) References Cited

U.S. PATENT DOCUMENTS

| 4,070,262 A | 1/1978 | Guarino et al. |
| 4,922,004 A | 5/1990 | Kohler et al. |
| 2004/0099170 A1 | 5/2004 | Takabayashi |
| 2005/0203199 A1 | 9/2005 | Moszner et al. |
| 2006/0014848 A1 | 1/2006 | Loccufier et al. |

FOREIGN PATENT DOCUMENTS

| EP | 0005379 | * | 11/1979 |
| GB | 2280905 A | * | 2/1995 |
| WO | WO 2007017348 A2 | * | 2/2007 |

OTHER PUBLICATIONS

STN Structure Search Results (Jul. 10, 2012).*
Official Communication issued in International Patent Application No. PCT/EP2008/061484, mailed on Nov. 12, 2008.

* cited by examiner

*Primary Examiner* — Vu A Nguyen
(74) *Attorney, Agent, or Firm* — Keating & Bennett, LLP

(57) ABSTRACT

A liquid radiation curable composition for inkjet printing includes a photoinitiating system consisting of one or more diffusion hindered photoinitiators selected from the group consisting of non-polymeric di- or multifunctional initiators, oligomeric or polymeric initiators, and polymerizable initiators, and one or more polymerizable co-initiators, wherein at least one of the polymerizable co-initiators is a polymerizable aromatic tertiary amine. Inkjet inks, an inkjet printing process, and packaging materials may include the liquid radiation curable composition.

19 Claims, No Drawings

RADIATION CURABLE COMPOSITIONS FOR FOOD APPLICATIONS

CROSS-REFERENCE TO RELATED APPLICATIONS

This application is a 371 National Stage Application of PCT/EP2008/061484, filed Sep. 1, 2008. This application claims the benefit of U.S. Provisional Application No. 60/970,630, filed Sep. 7, 2007, which is incorporated by reference herein in its entirety. In addition, this application claims the benefit of European Application No. 07115607.9, filed Sep. 4, 2007, which is also incorporated by reference herein in its entirety.

BACKGROUND OF THE INVENTION

1. Field of the Invention

This invention relates to radiation curable compositions, more particularly radiation curable inks and inkjet inks and their use in inkjet printing processes and ink sets.

2. Description of the Related Art

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a print head across the ink-receiver or vice versa or both.

When jetting the inkjet ink onto an ink-receiver, the ink typically includes a liquid vehicle and one or more solids, such as dyes or pigments and polymers. Ink compositions can be roughly divided in:

water-based, the drying mechanism involving absorption, penetration and evaporation;

solvent-based, the drying primarily involving evaporation;

oil-based, the drying involving absorption and penetration;

hot melt or phase change, in which the ink is liquid at the ejection temperature but solid at room temperature and wherein drying is replaced by solidification; and UV-curable, in which drying is replaced by polymerization.

It should be clear that the first three types of ink compositions are more suitable for an absorbing receiving medium, whereas hot melt inks and UV-curable inks can also be printed on non-absorbing ink-receivers. Due to thermal requirements posed by hot melt inks on the substrates, especially radiation curable inks have gained the interest of the packaging industry.

In general, UV curable inks contain colorants, monomers, photoinitiators and polymerization synergists. Preferred types of synergists are tertiary amines which are admixed to acrylate based radiation curable inks for two main reasons:

i) to reduce air inhibition and thereby increase cure speed of inks including Norrish I type photoinitiators; and ii) to initiate the so called Norrish II type photopolymerisation, wherein a Norrish II type photoinitiator, e.g. a benzophenone type, abstracts a hydrogen from the amine forming radicals that promote radical polymerisation of acrylate monomers.

Migrateable residues in coatings used for packaging of foodstuffs present a health risk and consequently they should be kept to an absolute minimum. Known measures to reduce extractables of the photo-initiating system from cured ink layers include the use of polymeric or co-polymerizable photoinitiators and synergists instead of the usual low molecular weight compounds. However, in many cases it was reported that the curing speed was significantly reduced and this was believed to be due to the fact of reduced mobility of the photoinitiator or synergist.

US 2006014848 (AGFA) discloses radiation curable inkjet inks including a polymeric co-initiator including a dendritic polymer core with at least one co-initiating functional group as an end group. Aliphatic amines and aromatic amines are included as suitable co-initiating functional groups. The dendritic polymeric architecture allows to obtain low extractables and at the same time minimizes the increase in viscosity of the ink. No polymerizable amine synergists are disclosed.

U.S. Pat. No. 4,070,262 (MOBIL OIL) discloses a UV curable coating composition wherein the adhesion of a UV cured film is improved by replacing all or part of a non-polymerizable tertiary amine with dimethylaminoethyl acrylate. The application is silent on the suitability of the coating compositions for food packaging applications.

US 2005203199 (IVOCLAR VIVADENT) discloses a dental paste including a radically polymerizable organic binder, at least one initiator for the radical polymerization and at least one accelerator for the radical polymerization, wherein both initiator and accelerator each have at least one radically polymerizable group. Suitable polymerizable amine accelerators include 4-dimethylaminobenzoic acid derivatives among others. A dental formulation is typically a high viscous composition not imposing high demands towards colloid stability in contrast to inkjet inks where the colloid stability of fine particle dispersions is of vital importance for the application. The application is silent on low viscous liquid curable compositions.

Ink jet inks have to meet very high demands on shelf life in combination with a low viscosity. This requires a dedicated design of all components of the ink jet ink to guarantee a good shelf life (storage stability) in a low viscous formulation. Food compliant inks further must have a very low amount of extractables.

SUMMARY OF THE INVENTION

Preferred embodiments of the present invention provide a stable liquid radiation curable composition suitable for food packaging applications.

Further preferred embodiments of the present invention provide an inkjet ink, preferably an inkjet ink set, and an inkjet printing process for printing on packaging materials exhibiting a low amount of extractables.

Another preferred embodiment of the present invention provides a packaging material with a white primer or a clear glossy outermost topcoat layer exhibiting a low amount of extractables.

These and other preferred embodiments of the invention will become apparent from the description hereinafter.

DETAILED DESCRIPTION OF THE PREFERRED EMBODIMENTS

It was surprisingly found that low viscous liquid radiation curable compositions and inkjet inks could be prepared exhibiting high shelf-life stability and a very low amount of extractables in printing applications by using a diffusion hindered photoinitiator in combination with a specific polymerizable aromatic tertiary amine.

A preferred embodiment of the present invention is realized with a liquid radiation curable composition as defined below.

Other preferred embodiments of the present invention are also realized with an inkjet ink as defined below.

Other preferred embodiments of the present invention are also realized with an inkjet printing process as defined below.

Other preferred embodiments of the present invention are also realized with a packaging material as defined below.

Further advantages and preferred embodiments of the present invention will become apparent from the following description.

Definitions

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as a colouring agent that is practically insoluble in the application medium under the pertaining ambient conditions, hence having a solubility of less than 10 mg/L therein.

The term "mixed crystal", which is synonymous for "solid solution", as used in disclosing the present invention, means a solid, homogeneous mixture of two or more constituents, which may vary in composition between certain limits and remain homogeneous.

The term "C.I." is used in disclosing the present application as an abbreviation for Colour Index.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc. Liquid radiation curable compositions The liquid radiation curable composition according to a preferred embodiment of the present invention includes a photoinitiating system consisting of one or more diffusion hindered photoinitiators and one or more polymerizable co-initiators wherein at least one of the polymerizable co-initiators is a co-initiator according to Formula (I):

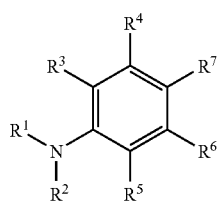

Formula (I)

wherein, $R^1$ and $R^2$ are independently selected from the group consisting of an alkyl group, an alkenyl group, an alkynyl group, an aralkyl group, an alkaryl group, an aryl group and a heteroaryl group;

$R^3$ to $R^6$ are independently selected from the group consisting of hydrogen, an alkyl group, an alkenyl group, an alkynyl group, an acyl group, a thioalkyl group, an alkoxy group, a halogen, an aralkyl group, an alkaryl group, an aryl group and a heteroaryl group;

$R^7$ is selected from the group consisting of hydrogen, an aldehyde group, a ketone group, an ester group, an amide group, an acyl group, a thioalkyl group, an alkoxy group, a halogen, a nitrile group, a sulphonate group, a sulphonamide group, an alkyl group, an alkenyl group, an alkynyl group, an aralkyl group, an alkaryl group, an aryl group and a heteroaryl group;

$R^1$ and $R^2$, $R^1$ and $R^3$, $R^2$ and $R^5$, $R^3$ and $R^4$, $R^4$ and $R^7$, $R^5$ and $R^6$, and $R^6$ and $R^7$ may represent the necessary atoms to form a 5 to 8 membered ring; and with the proviso that the aromatic amine has at least one alfa hydrogen; and at least one of $R^1$ to $R^7$ includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile. In the polymerizable co-initiator, preferably $R^7$ represents an electron withdrawing group selected from the group consisting of an aldehyde, a ketone, an ester and an amide, and more preferably $R^3$, $R^4$, $R^5$ and $R^6$ all represent hydrogen.

The alkyl groups, the alkenyl groups, the alkynyl groups, the acyl groups, the thioalkyl groups, the alkoxy groups, the aralkyl groups, the alkaryl groups, the aryl groups and the heteroaryl groups used for $R^1$ to $R^7$ can be substituted or unsubstituted groups, i.e. substituted or unsubstituted alkyl groups, substituted or unsubstituted alkenyl groups, substituted or unsubstituted alkynyl group, substituted or unsubstituted acyl groups, substituted or unsubstituted thioalkyl groups, substituted or unsubstituted alkoxy groups, substituted or unsubstituted aralkyl groups, substituted or unsubstituted alkaryl groups, substituted or unsubstituted aryl groups and substituted or unsubstituted heteroaryl groups may be used.

In a preferred embodiment, the polymerizable co-initiator corresponds to Formula (II):

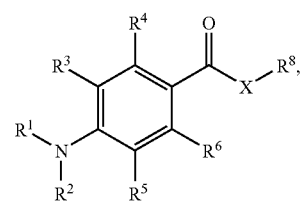

Formula (II)

wherein, $R^1$ to $R^6$ have the same meaning as defined for Formula (I);

X is selected from the group consisting of O, S and $NR^9$;

$R^8$ and $R^9$ are independently selected from the group consisting of hydrogen, an alkyl group, an alkenyl group, an alkynyl group, an aralkyl group, an alkaryl group, an aryl group and a heteroaryl group;

$R^1$ and $R^2$, $R^1$ and $R^3$, $R^2$ and $R^5$, $R^3$ and $R^4$, $R^5$ and $R^6$, $R^4$ and $R^8$, $R^6$ and $R^8$, and $R^8$ and $R^9$ may represent the necessary atoms to form a 5 to 8 membered ring; and at least one of $R^1$ to $R^6$ and $R^8$ includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile. In the polymerizable co-initiator, preferably $R^3$, $R^4$, $R^5$ and $R^6$ all represent hydrogen.

In one preferred embodiment of the polymerizable co-initiator having Formula (II), R1 represents methyl or ethyl and $R^2$ includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile; and more preferably also $R^3$, $R^4$, $R^5$ and $R^6$ all represent hydrogen.

In another preferred embodiment of the polymerizable co-initiator having Formula (II), R1 and $R^2$ independently represent methyl or ethyl and $R^8$ includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile; and more preferably also $R^3$, $R^4$, $R^5$ and $R^6$ all represent hydrogen.

In a more preferred embodiment, the polymerizable co-initiator corresponds to Formula (III):

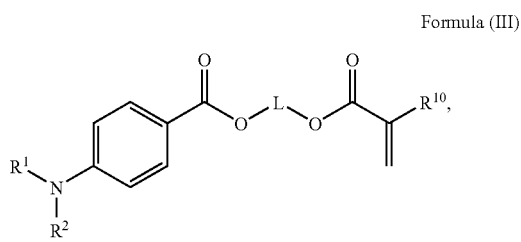

Formula (III)

$R^1$ and $R^2$ are independently selected from the group consisting of methyl, ethyl, propyl and butyl;

L represents a divalent linking group including at least one carbon atom; and $R^{10}$ represents hydrogen, methyl, ethyl, propyl or butyl.

In a preferred embodiment the divalent linking group L includes 1 to 30 carbon atoms, more preferably 2 to 10 carbon atoms and most preferably 3 to 6 atoms.

The polymerizable co-initiator may contain two, three or more polymerizable ethylenically unsaturated functional groups independently selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile.

The polymerizable co-initiator may also contain more than one tertiary amine functional group, preferably the second or third tertiary amine functional group is also an aromatic tertiary amine, most preferably a dialkylamino benzoic acid derivative.

Suitable polymerizable co-initiators are given below in Table 1 without being limited thereto.

TABLE 1

| | |
|---|---|
| COINI-1 | 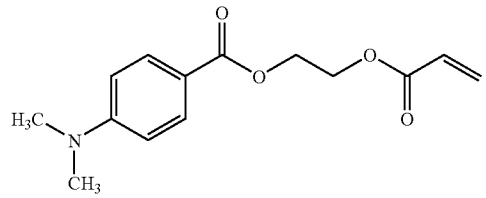 [SMILES: C=CC(=O)OCCOC(=O)c1ccc(N(C)C)cc1] |
| COINI-2 | 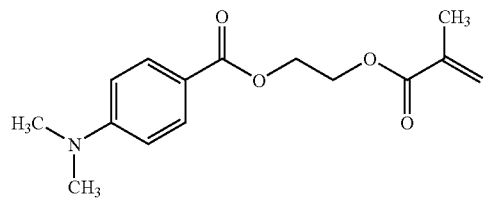 [SMILES: C=C(C)C(=O)OCCOC(=O)c1ccc(N(C)C)cc1] |
| COINI-3 | 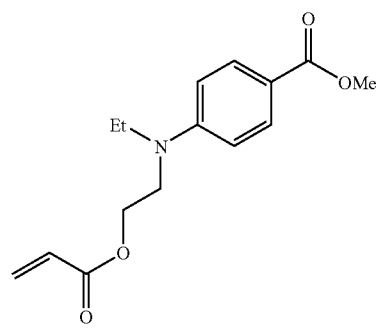 [SMILES: C=CC(=O)OCCN(CC)c1ccc(C(=O)OC)cc1] |
| COINI-4 | 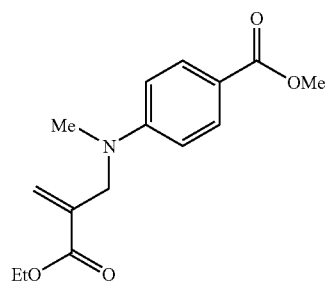 [SMILES: C=C(CN(C)c1ccc(C(=O)OC)cc1)C(=O)OCC] |

TABLE 1-continued
COINI-5
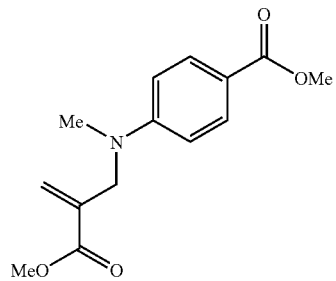 [SMILES: C=C(CN(C)c1ccc(C(=O)OC)cc1)C(=O)OC]
COINI-6
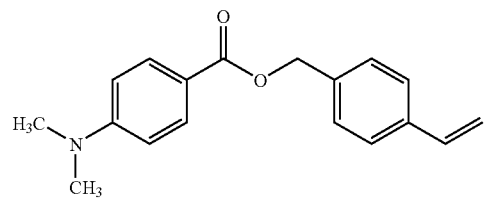 [SMILES: C=Cc1ccc(COC(=O)c2ccc(N(C)C)cc2)cc1]
COINI-7
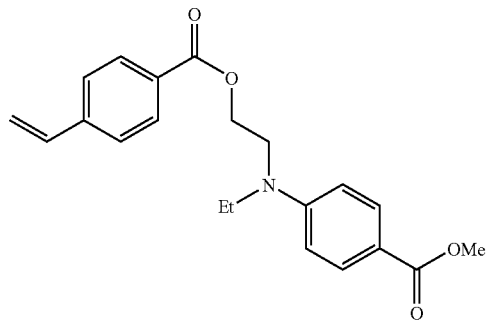 [SMILES: C=Cc1ccc(C(=O)OCCN(CC)c2ccc(C(=O)OC)cc2)cc1]
COINI-8
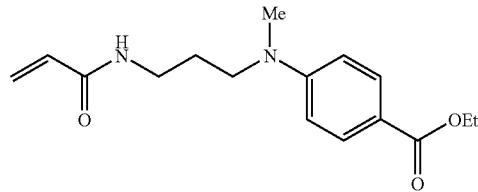 [SMILES: C=CC(=O)NCCCN(C)c1ccc(C(=O)OCC)cc1]
COINI-9
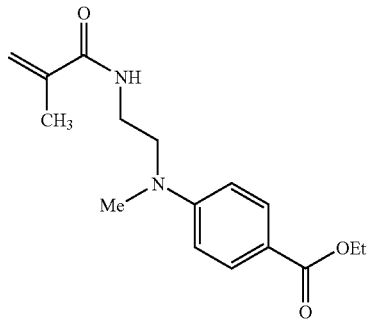 [SMILES: C=C(C)C(=O)NCCN(C)c1ccc(C(=O)OCC)cc1]
COINI-10
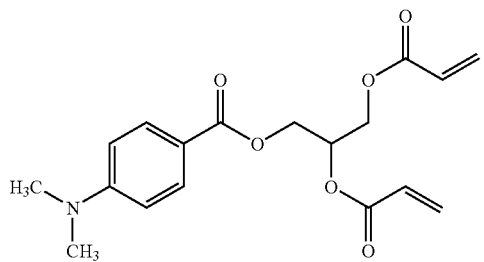 [SMILES: C=CC(=O)OCC(COC(=O)c1ccc(N(C)C)cc1)OC(=O)C=C]

TABLE 1-continued
COINI-11
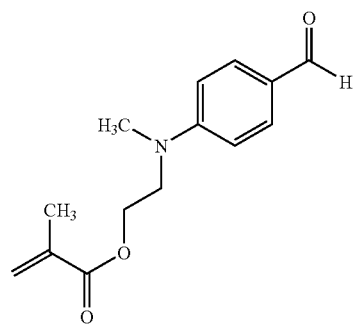 [SMILES: C=C(C)C(=O)OCCN(C)c1ccc(C=O)cc1]
COINI-12
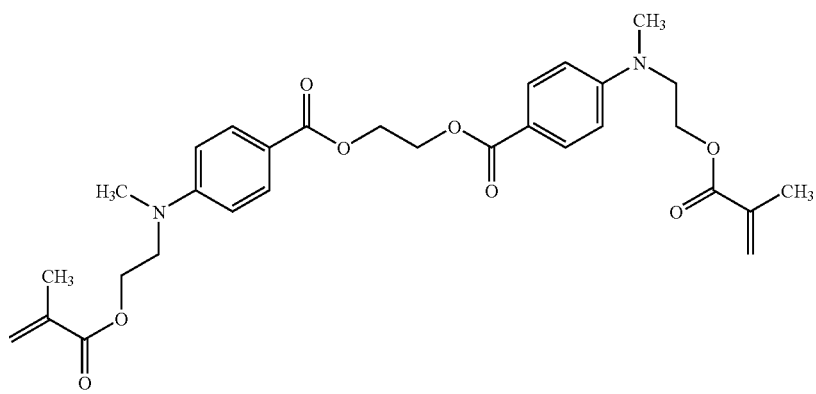 [SMILES: C=C(C)C(=O)OCCN(C)c1ccc(C(=O)OCCOC(=O)c2ccc(N(C)CCOC(=O)C(=C)C)cc2)cc1]
COINI-13
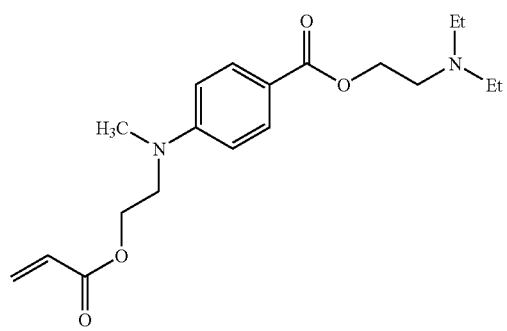 [SMILES: C=CC(=O)OCCN(C)c1ccc(C(=O)OCCN(CC)CC)cc1]
COINI-14
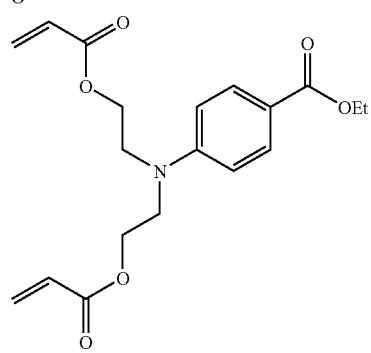
COINI-15
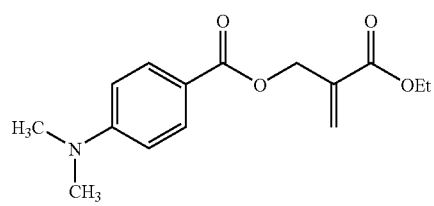 [SMILES: C=C(COC(=O)c1ccc(N(C)C)cc1)C(=O)OCC]

TABLE 1-continued

COINI-16 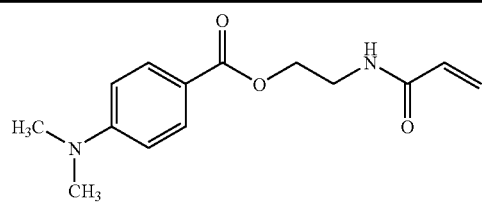

COINI-17 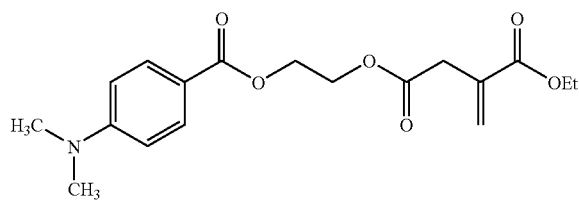 [SMILES: C=C(CC(=O)OCCOC(=O)c1ccc(N(C)C)cc1)C(=O)OCC]

COINI-18 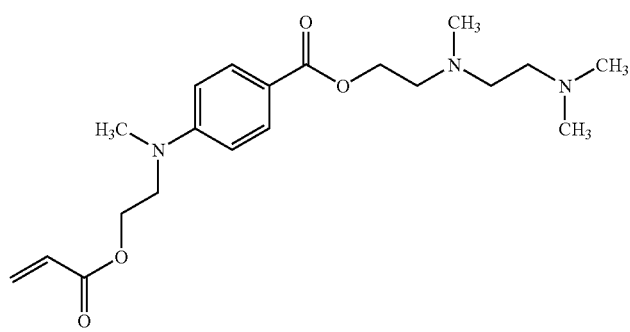 [SMILES: C=CC(=O)OCCN(C)c1ccc(C(=O)OCCN(C)CCN(C)C)cc1]

COINI-19 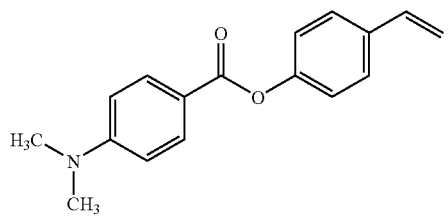 [SMILES: C=Cc1ccc(OC(=O)c2ccc(N(C)C)cc2)cc1]

COINI-20 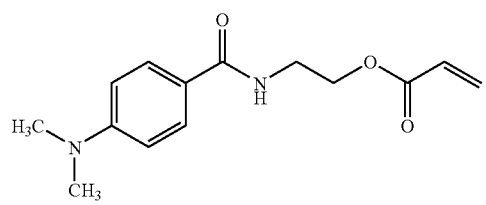

COINI-21 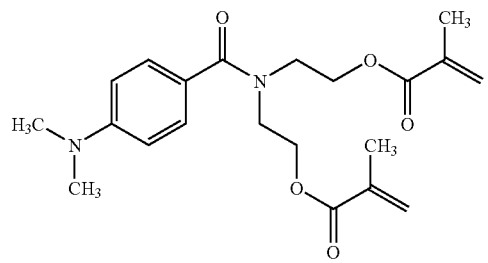 [SMILES: C=C(C)C(=O)OCCN(CCOC(=O)C(=C)C)C(=O)c1ccc(N(C)C)cc1]

The liquid radiation curable composition according to a preferred embodiment of the present invention includes the polymerizable co-initiator in an amount of 0.1 to 50 wt %, more preferably in an amount of 0.5 to 25 wt %, most preferably in an amount of 1 to 10 wt % of the total weight of the liquid radiation curable composition. In a preferred embodiment, the weight ratio of co-initiator(s) over photo-initiator(s) is between 1:2 and 2:1.

The liquid radiation curable composition according to a preferred embodiment of the present invention contains a diffusion hindered photoinitiator. A diffusion hindered photoinitiator is a photoinitiator which exhibits a lower mobility in a cured layer of the liquid radiation curable composition than a monofunctional photoinitiator, such as benzophenone. Several methods can be used to lower the mobility of the photoinitiator. One way is to increase the molecular weight of the photoinitiator so that the diffusion speed is reduced, e.g. difunctional photoinitiators or polymeric photoiniators. Another way is to increase its reactivity so that it is built into the polymerizing network, e.g. multifunctional photoinitiators and polymerizable photoinitiators. The diffusion hindered photoinitiator is preferably selected from the group consisting of non-polymeric di- or multifunctional photoinitiators, oligomeric or polymeric photoinitiators and polymerizable photoinitiators. Non-polymeric di- or multifunctional photoinitiators are considered to have a molecular weight between 300 and 900 Dalton. Monofunctional photoinitiators with a molecular weight in that range are not diffusion hindered photoinitiators. Both type I and type II photoinitiators can be used in the present invention, alone or in combination.

In one preferred embodiment a polymerizable photoinitiator is used for a diffusion hindered photoinitiator.

In another preferred embodiment a polymeric photoinitiator is used for a diffusion hindered photoinitiator, preferably the polymeric photoinitiator contains two, three, four or more photoinitiating groups.

A combination of diffusion hindered photoinitiators may also be included in the liquid radiation curable composition. Preferably a combination of two, three or more polymerizable photoinitiators is used in the liquid radiation curable composition. Another preferred combination is one or more polymerizable photoinitiators and a polymeric photoinitiator.

The liquid radiation curable composition includes preferably at least one colorant. Most preferably the colorant in the liquid radiation curable composition is a pigment. The pigment is preferably dispersed with a dispersant, more preferably a polymeric dispersant.

The liquid radiation curable composition includes monomers and/or oligomers which may possess different degrees of functionality. A mixture including combinations of mono-, di-, tri- and/or higher functionality monomers and oligomers may be used.

The liquid radiation curable composition may further also contain at least one surfactant.

The liquid radiation curable composition preferably does not contain an evaporable component, but sometimes, it can be advantageous to incorporate a small amount of an organic solvent to improve adhesion to the surface of the ink-receiver after UV-curing. In this case, the added solvent can be any amount in the range that does not cause problems of solvent resistance and VOC-emission, preferably in an amount of 0.1-10.0 wt %, and particularly preferably in amount of 0.1-5.0 wt %, each based on the total weight of the liquid radiation curable composition. Most preferably the liquid radiation curable composition does not contain an organic solvent or water.

The liquid radiation curable composition according to a preferred embodiment of the present invention preferably has a viscosity smaller than 100 mPa·s at 30° C. and at a shear rate of 100 s$^{-1}$.

The liquid radiation curable composition can be advantageously used for reducing the amount of extractables in printing applications for food packaging. In a preferred embodiment, the printing application is an inkjet printing process. The liquid radiation curable composition can be applied as a primer layer to improve properties such as adhesion or spreading of the inkjet inks, but also as a barrier layer for preventing diffusion of components from an image printed upon the primer into the packaging material. However, it can also be applied as an outermost topcoat layer, for example, to give a glossy appearance to the product packaging material or as a barrier layer for preventing offset of components from the printed image to the backside the packaging material when the printed material was transported as a roll of packaging material.

A liquid radiation curable composition fulfilling the requirements of jettability can be used as a radiation curable inkjet ink. Also impact printing techniques, such as offset printing, flexographic printing, gravure and screen printing, can be used, but preferably the liquid radiation curable composition is applied by non-impact printing, e.g. jetting or spraying, more preferably by inkjet printing.

Inks, Inkjet Inks and Ink Sets

In a preferred embodiment, the liquid radiation curable composition is a radiation curable inkjet ink. The amount of polymerizable co-initiator or co-initiators is in general from 0.01 to 25 wt %, preferably from 0.05 to 10 wt %, based in each case on the total weight of the curable inkjet ink.

The radiation curable inkjet ink preferably contains one or more colour pigments as colorant. The radiation curable inkjet ink is preferably part of an inkjet ink set wherein all inkjet inks have a liquid radiation curable composition according to a preferred embodiment of the present invention.

A curable pigment inkjet ink set preferably includes at least one yellow curable pigment inkjet ink (Y), at least one cyan curable pigment inkjet ink (C) and at least one magenta curable pigment inkjet ink (M) and preferably also at least one black curable pigment inkjet ink (K). The curable CMYK inkjet ink set may also be extended with extra inks such as red, green, blue, and/or orange to further enlarge the colour gamut of the image. The CMYK ink set may also be extended by the combination of full density and light density inks of both colour inks and/or black inks to improve the image quality by lowered graininess.

In a preferred embodiment, the radiation curable pigment inkjet ink set is a UV-curable pigment inkjet ink set.

The radiation curable inkjet ink may further also contain at least one inhibitor.

The radiation curable inkjet ink may further also contain at least one surfactant.

The radiation curable inkjet ink is most preferably a non-aqueous inkjet ink. The term "non-aqueous" refers to a liquid carrier which should contain no water. However sometimes a small amount, generally less than 5 wt % of water based on the total weight of the ink, can be present. This water was not intentionally added but came into the formulation via other components as a contamination, such as for example polar organic solvents. Higher amounts of water than 5 wt % tend to make the non-aqueous inkjet inks instable, preferably the water content is less than 1 wt % based on the total weight of the ink and most preferably no water at all is present The radiation curable inkjet ink preferably does not contain an evaporable component such as an organic solvent. But sometimes it can be advantageous to incorporate a small amount of an organic solvent in such inks to improve adhesion to the surface of the ink-receiver after UV-curing. In this case, the added solvent can be any amount in the range that does not cause problems of solvent resistance and VOC-emission, preferably in an amount of 0.1-10.0 wt %, and particularly preferably in an amount of 0.1-5.0 wt %, each based on the total weight of the curable inkjet ink.

The curable pigment inkjet inks may contain a dispersion synergist to improve the dispersion quality of the inkjet ink. Preferably, at least the magenta inkjet ink contains a dispersion synergist. A mixture of dispersion synergists may be used to further improve dispersion stability.

The viscosity of the inkjet ink is preferably smaller than 100 mPa·s at 30° C. and at a shear rate of 100 s$^{-1}$. The viscosity of the inkjet ink is preferably smaller than 30 mPa·s, more preferably lower than 15 mPa·s, and most preferably between 2 and 10 mPa·s at a shear rate of 100 s$^{-1}$ and a jetting temperature between 10 and 70° C.

Diffusion Hindered Photoinitiator

The co-initiators in the liquid radiation curable composition and inkjet inks according to a preferred embodiment of the present invention have to be used in combination with a diffusion hindered initiator. A diffusion hindered initiator is selected from the group consisting of non-polymeric di- or multifunctional initiators, oligomeric or polymeric initiators and polymerizable initiators. More preferably the diffusion hindered photoinitiator is selected from the group consisting of polymeric initiators and polymerizable initiators. Both type I and type II initiators can be used in the present invention.

A preferred amount of diffusion hindered photoinitiator is 0.3-50 wt %, and more preferably 1-15 wt % of the total weight of the liquid radiation curable composition or inkjet ink.

Irradiation with actinic radiation may be realized in two steps by changing wavelength or intensity. In such cases it is preferred to use 2 types of diffusion hindered photoinitiator together.

The diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

The diffusion hindered photoinitiator may contain one or more photoinitiating functional groups derived from a Norrish type II-initiator selected from the group consisting of benzophenones, thioxanthones, 1,2-diketones and anthraquinones.

Other photoinitiators suitable for the photoinitiating functional groups in preparing diffusion hindered photoinitiators are disclosed by CRIVELLO, J. V., et al.; Chemistry & technology of UV & EB Formulation for Coatings, Inks & Paints. Volume III: Photoinitiators for Free Radical, Cationic & Anionic Photopolymerisation, 2nd edition, John Wiley & Sons Ltd in association with SITA Technology Ltd, London, UK, 1998 edited by Dr. G. Bradley; ISBN 0471 978922, page 287-294.

Difunctional and Multifunctional Photoinitiators

Typical non-polymeric di- and multifunctional initiators have been disclosed in WO 2005/040083 (LAMBERTI S.P.A), WO 2004/099262 (CIBA SPECIALTY CHEMICALS) and Burrows et al., Surface Coatings International, Part B: Coatings Transactions 87(B2), 127-135 (2004) and by Ye et al., Polymer 47(13), 4603-4612 (2006).

Suitable non-polymeric multifunctional initiators are given below in Table 2 without being limited thereto.

TABLE 2

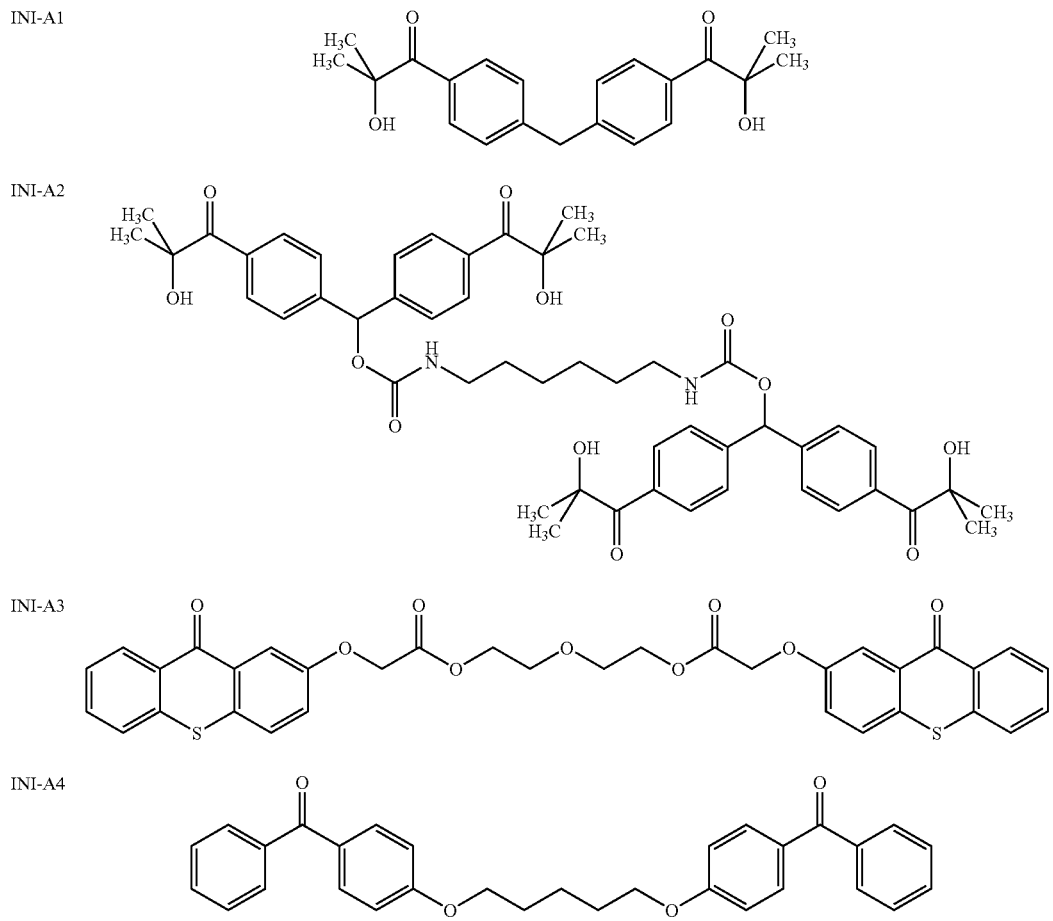

TABLE 2-continued

INI-A5
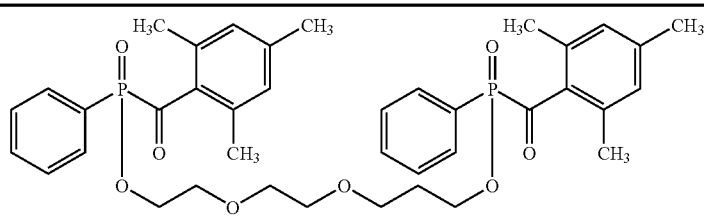

INI-A6
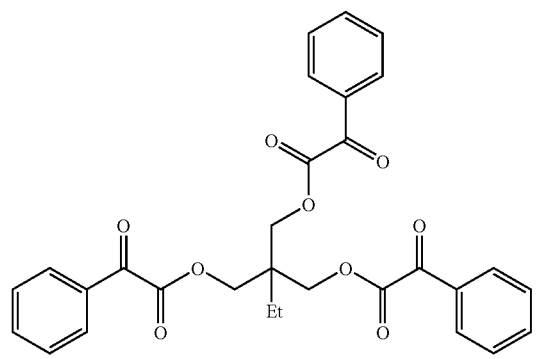 [SMILES: CCC(COC(=O)C(=O)c1ccccc1)(COC(=O)C(=O)c1ccccc1)COC(=O)C(=O)c1ccccc1]

INI-A7
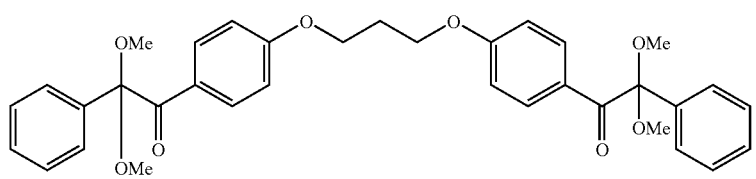

INI-A8
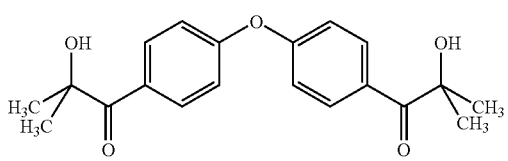 [SMILES: CC(C)(O)C(=O)c1ccc(Oc2ccc(C(=O)C(C)(C)O)cc2)cc1]

INI-A9
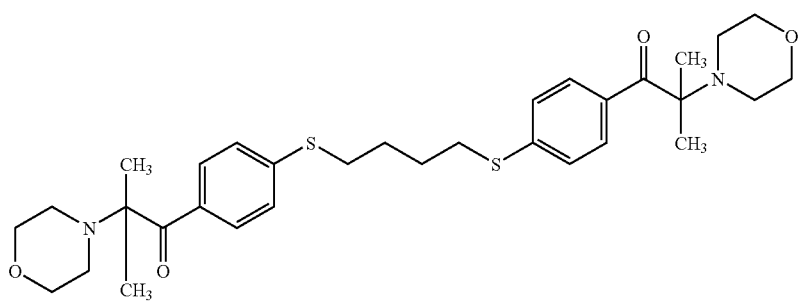 [SMILES: CC(C)(C(=O)c1ccc(SCCCCSc2ccc(C(=O)C(C)(C)N3CCOCC3)cc2)cc1)N1CCOCC1]

INI-A10
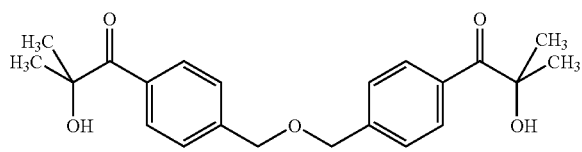 [SMILES: CC(C)(O)C(=O)c1ccc(COCc2ccc(C(=O)C(C)(C)O)cc2)cc1]

In comparison with their monofunctional analogues, it was observed that non-polymeric di- and multifunctional photoinitiators resulted in far less detectable extractables. Another advantage, especially for inkjet inks, is that non-polymeric di- and multifunctional photoinitiators have limited or no influence on the viscosity, contrary to the polymeric photoinitiators.

Polymeric Photoinitiators

Typical polymeric initiators, useful in the present invention, have been recently reviewed by Hrdlovic P. (Polymer News, 30(6), 179-182 (2005) and Polymer News, 30(8), 248-250 (2005)) and Corrales T. (Journal of Photochemistry and Photobiology A: Chemistry 159 (2003), 103-114). Further interesting polymeric photoinitiators can be found in CRIVELLO, J. V., et al.; Chemistry & technology of UV & EB Formulation for Coatings, Inks & Paints. Volume III: Photoinitiators for Free Radical, Cationic & Anionic Photopolymerisation, 2nd edition, John Wiley & Sons Ltd in association with SITA Technology Ltd, London, UK, 1998 edited by Dr. G. Bradley; ISBN 0471 978922, page 208-224.

Particularly suitable polymeric and oligomeric photoinitiators have been disclosed by Bertens et al. (RadTech Europe 05, Conference Proceedings (2005) 1, 473-478), by WO 03/033452 (COATES BROTHERS) and by WO 03/033492 (COATES BROTHERS).

In inkjet inks, the preferred polymeric architecture is a dendritic polymeric architecture, more preferably a hyperbranched polymeric architecture. Preferred hyperbranched polymeric photoinitiators for the radiation curable compositions according to the present invention are those disclosed in US 2006014851 (AGFA) incorporated herein as a specific reference.

Suitable polymeric and oligomeric initiators, useful in combination with the coinitiators according to the present invention, are given below in Table 3 without being limited thereto. The hyperbranched structures are illustrated with one specific molecular weight and degree of substitution out of the mixture for the sake of clarity.

TABLE 3

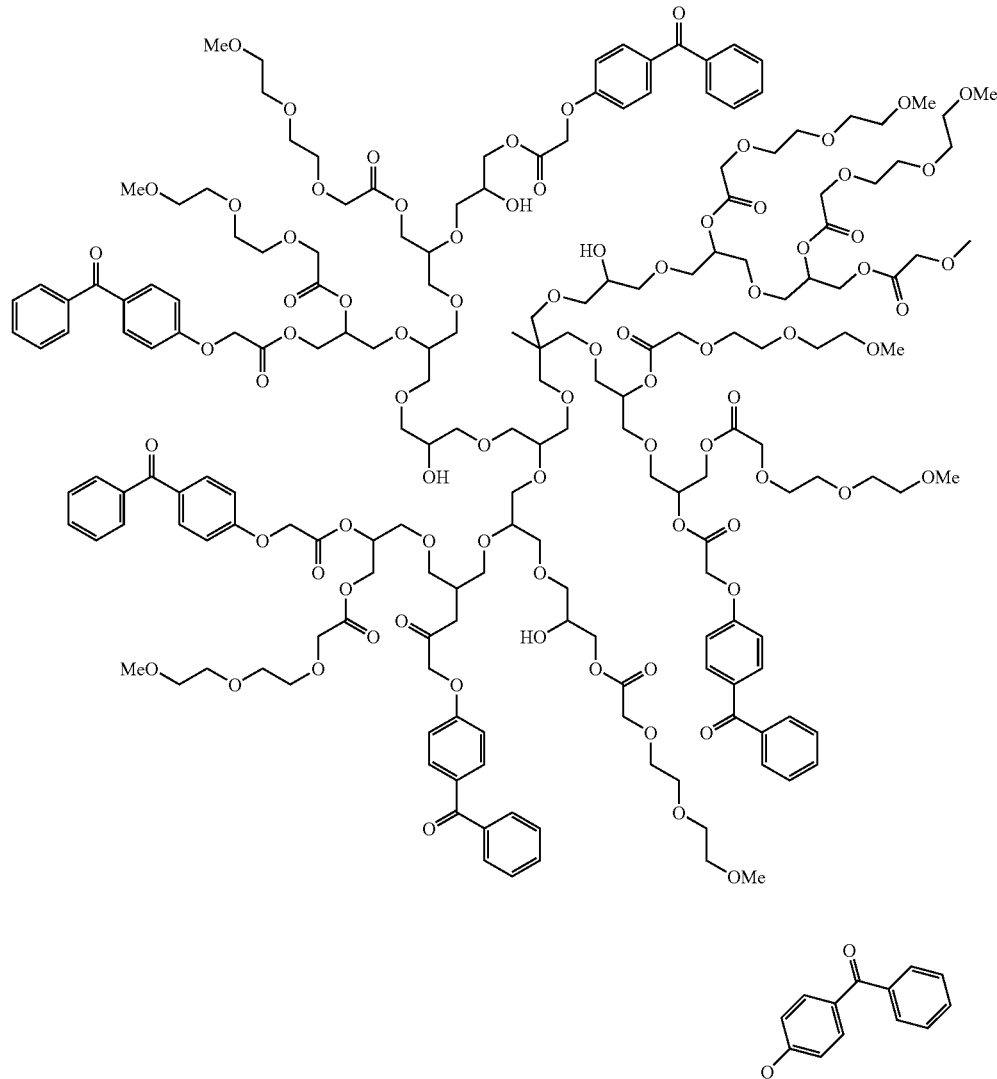 [SMILES: COCCOCCOCC(=O)OCC(O)COCC(COC(COCC(O)COCC(COCC(COC(=O)COCCOCCOC)OCC(O)COC(=O)COc1ccc(C(=O)c2ccccc2)cc1)OCC(COC(=O)COc1ccc(C(=O)c2ccccc2)cc1)OC(=O)COCCOCCOC)COCC(C)(COCC(O)COCC(COCC(COC(=O)COC)OC(=O)COCCOCCOC)OC(=O)COCCOCCOC)COCC(COCC(COC(=O)COCCOCCOC)OC(=O)COc1ccc(C(=O)c2ccccc2)cc1)OC(=O)COCCOCCOC)OCC(COCC(COC(=O)COCCOCCOC)OC(=O)COc1ccc(C(=O)c2ccccc2)cc1)CC(=O)COc1ccc(C(=O)c2ccccc2)cc1 ; O=C(c1ccccc1)c1ccc(O)cc1]

TABLE 3-continued
INI-B3
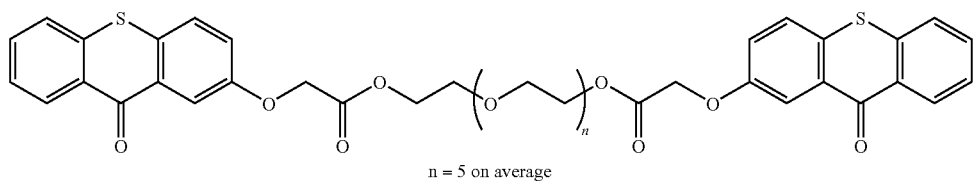
n = 5 on average
INI-B4
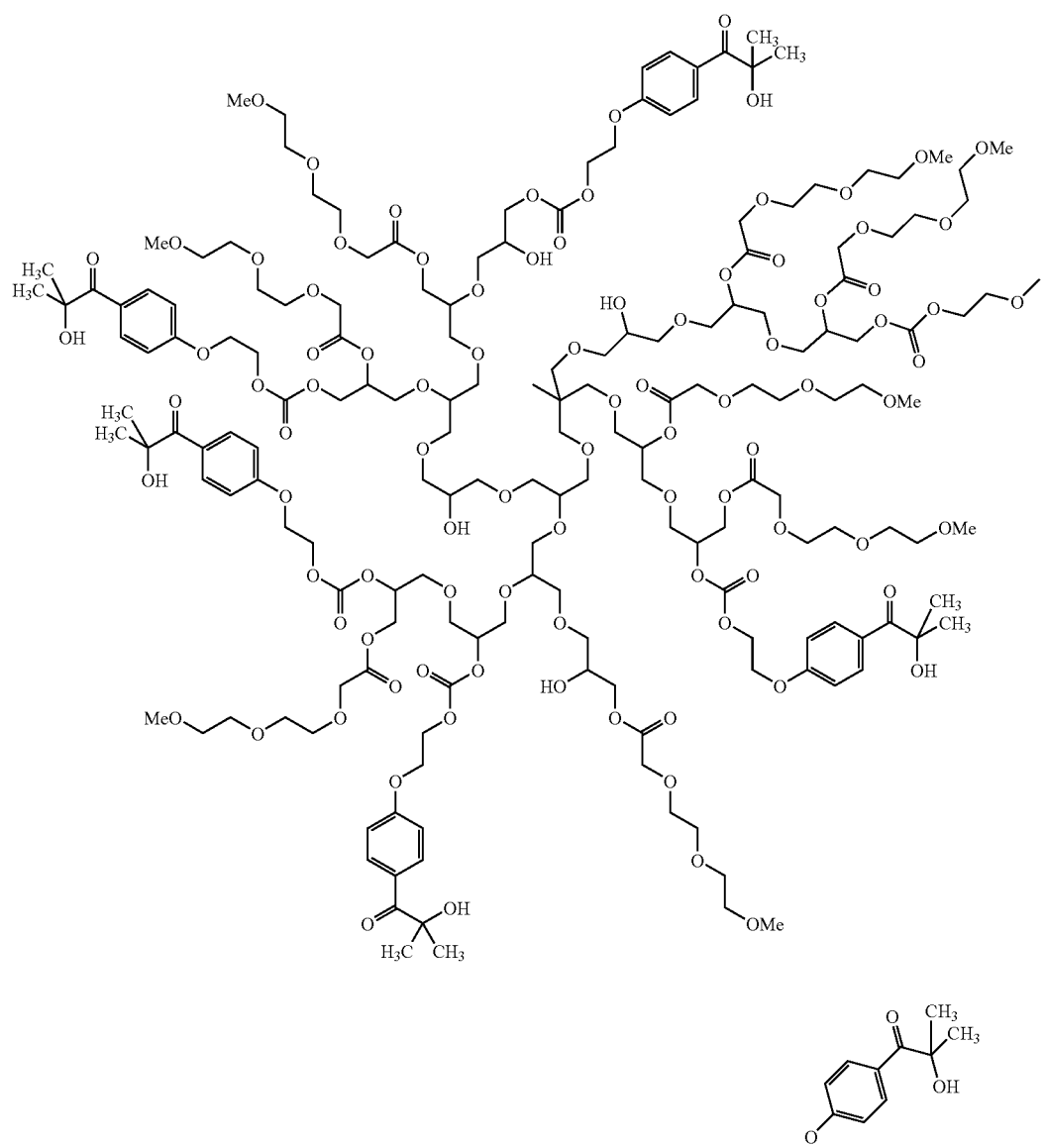 [SMILES: COCCOCCOCC(=O)OCC(O)COCC(COC(COCC(O)COCC(COCC(COC(=O)COCCOCCOC)OCC(O)COC(=O)OCCOc1ccc(C(=O)C(C)(C)O)cc1)OCC(COC(=O)OCCOc1ccc(C(=O)C(C)(C)O)cc1)OC(=O)COCCOCCOC)COCC(C)(COCC(O)COCC(COCC(COC(=O)OCCOC)OC(=O)COCCOCCOC)OC(=O)COCCOCCOC)COCC(COCC(COC(=O)COCCOCCOC)OC(=O)OCCOc1ccc(C(=O)C(C)(C)O)cc1)OC(=O)COCCOCCOC)OCC(COCC(COC(=O)COCCOCCOC)OC(=O)OCCOc1ccc(C(=O)C(C)(C)O)cc1)OC(=O)OCCOc1ccc(C(=O)C(C)(C)O)cc1 ; CC(C)(O)C(=O)c1ccc(O)cc1]

TABLE 3-continued
INI-B5
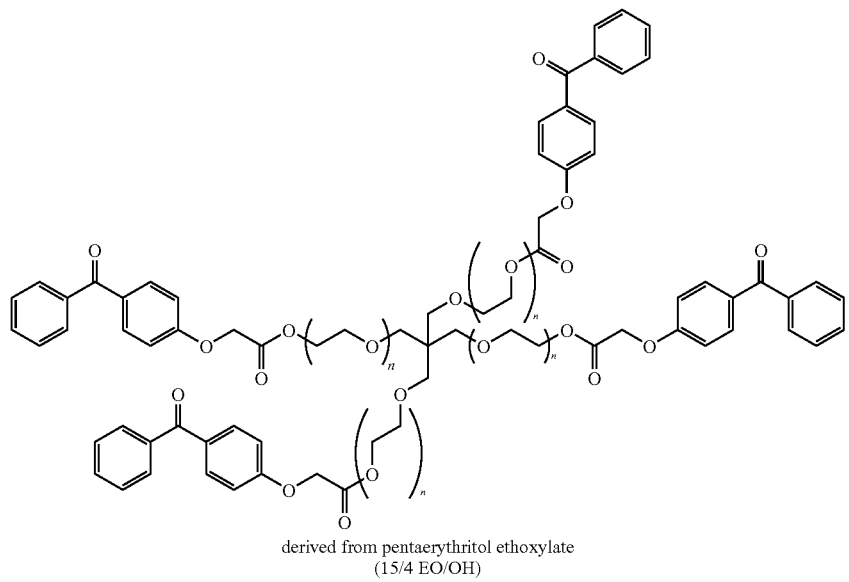
derived from pentaerythritol ethoxylate
(15/4 EO/OH)
INI-B6
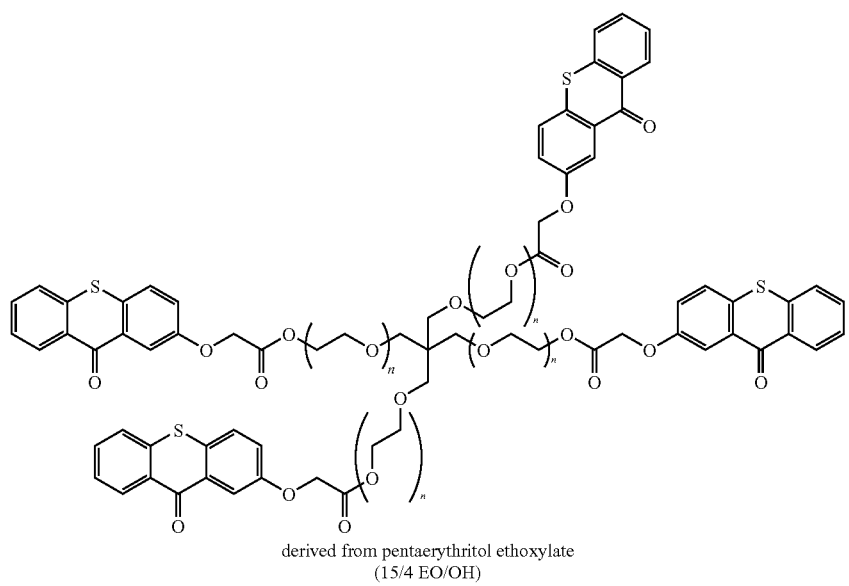
derived from pentaerythritol ethoxylate
(15/4 EO/OH)
INI-B7
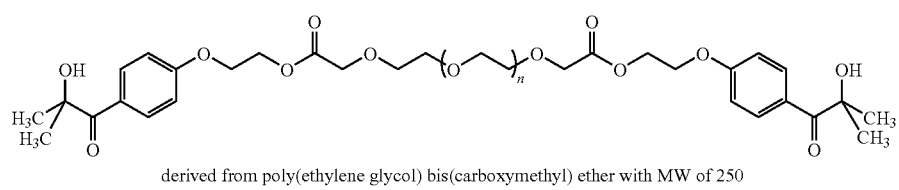
derived from poly(ethylene glycol) bis(carboxymethyl) ether with MW of 250
INI-B8
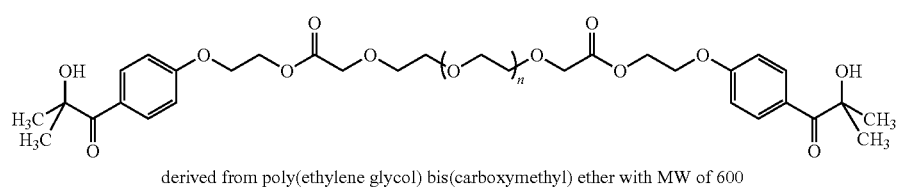
derived from poly(ethylene glycol) bis(carboxymethyl) ether with MW of 600

TABLE 3-continued
INI-B9
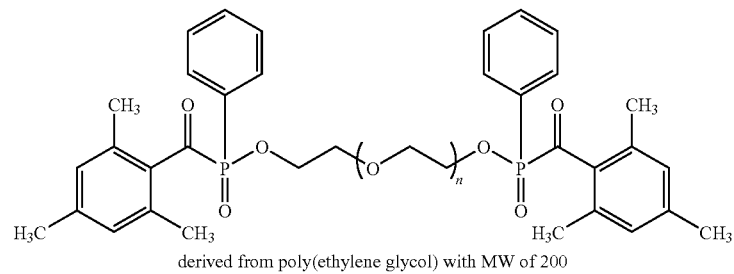
derived from poly(ethylene glycol) with MW of 200
INI-B10
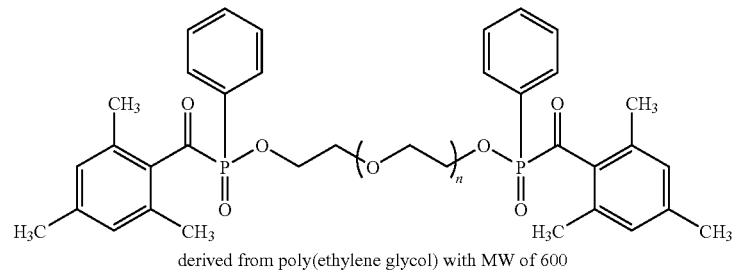
derived from poly(ethylene glycol) with MW of 600
INI-B11
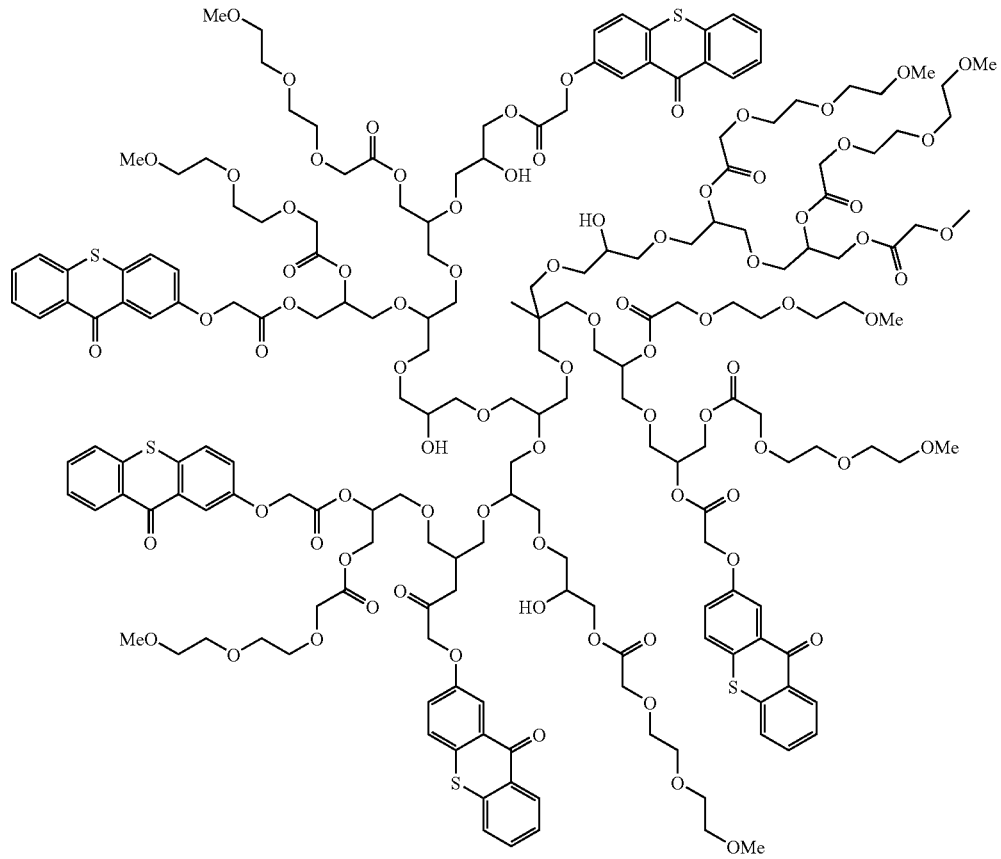
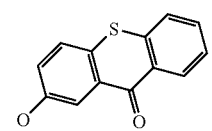

Polymerizable Photoinitiators

Typical polymerizable photoinitiators, useful in combination with the co-initiators in the liquid radiation curable composition according to a preferred embodiment of the present invention, have been disclosed in U.S. Pat. No. DE 3,534,645 (MERCK) and EP 0377191 A (BASF). Other suitable polymerizable photoinitiators have disclosed by Baeumer et al. (RADCUR '86, Conference Proceedings (1986), 4/43-4/55), Ruhlmann et al. (European Polymer Journal, 28(9), 1063-1067 (1992)) and Allen et al. (Journal of Photochemistry and Photobiology, A: Chemistry: 130(1,2), 185-189 (1997)).

Preferred polymerizable photoinitiators are given below in Table 4, without being limited thereto.

TABLE 4

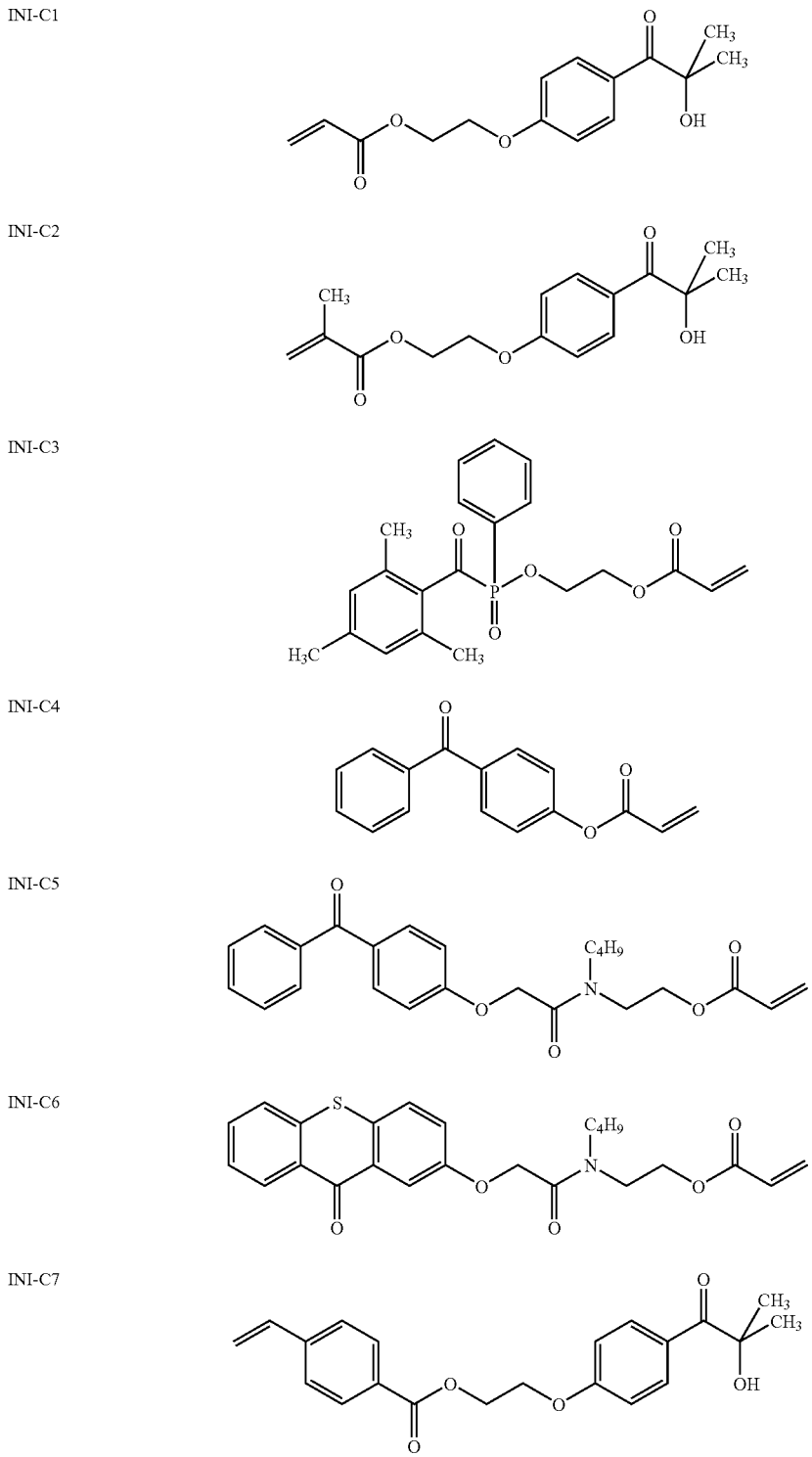

TABLE 4-continued

INI-C8

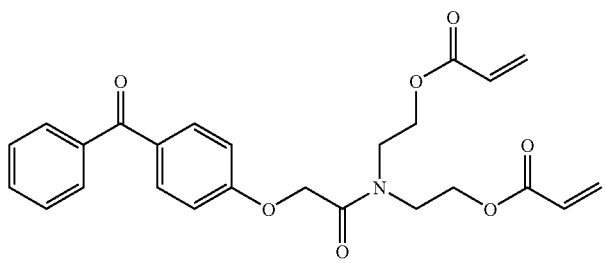 [SMILES: C=CC(=O)OCCN(CCOC(=O)C=C)C(=O)COc1ccc(C(=O)c2ccccc2)cc1]

INI-C9

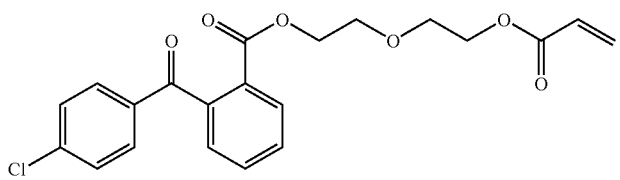 [SMILES: C=CC(=O)OCCOCCOC(=O)c1ccccc1C(=O)c1ccc(Cl)cc1]

INI-C10

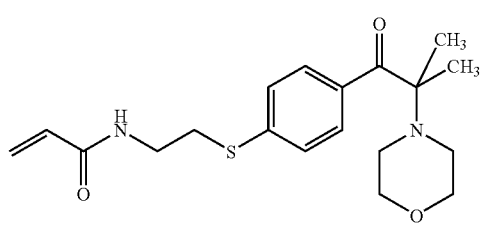 [SMILES: C=CC(=O)NCCSc1ccc(C(=O)C(C)(C)N2CCOCC2)cc1]

INI-C11

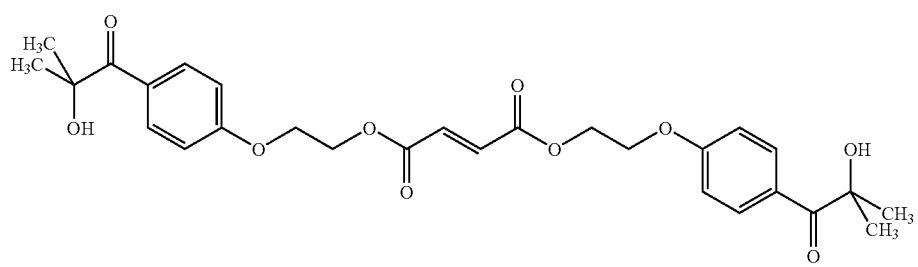 [SMILES: CC(C)(O)C(=O)c1ccc(OCCOC(=O)/C=C/C(=O)OCCOc2ccc(C(=O)C(C)(C)O)cc2)cc1]

INI-C12

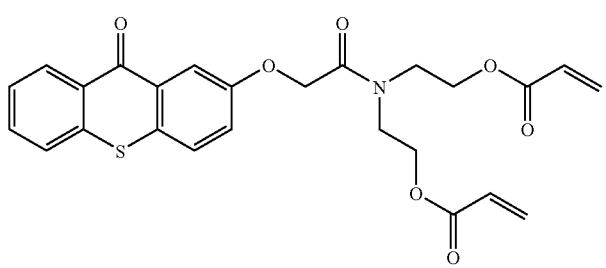 [SMILES: C=CC(=O)OCCN(CCOC(=O)C=C)C(=O)COc1ccc2sc3ccccc3c(=O)c2c1]

INI-C13

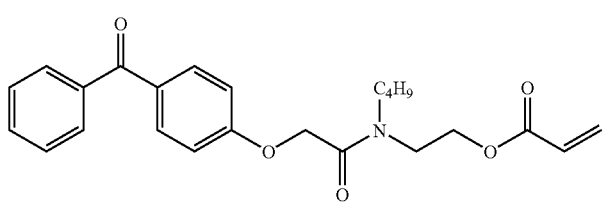

An advantage, especially for inkjet inks, is that non-polymeric polymerizable photoinitiators have limited or no influence on the viscosity, contrary to the polymeric photoinitiators while still exhibiting low extractables. Non-polymeric polymerizable photoinitiators preferably have a molecular weight of less than 900 Dalton.

Colorants

The liquid radiation curable compositions may contain a colorant. Colorants used in the curable liquids may be dyes, pigments or a combination thereof. Organic and/or inorganic pigments may be used.

The colorant is preferably a pigment or a polymeric dye. In food packaging applications, low molecular weight dyes, e.g smaller than 1000 Dalton, can still migrate into the food or be extracted by the food giving undesired coloration of the food, or even worse allergic reactions after consuming the solid or liquid food. Most preferably the colorant is a pigment.

The pigments may be black, white, cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley-VCH, 2004. ISBN 3527305769.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 255, 264, 266, 270 and 272.

Particular preferred pigments are C.I. Pigment Violet 1, 2, 19, 23, 32, 37 and 39.

Particular preferred pigments are C.I. Pigment Blue 15:1, 15:2, 15:3, 15:4, 15:6, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from Ciba Specialty Chemicals.

Carbon black is preferred as a black pigment. Suitable black pigments include carbon blacks such as Pigment Black 7 (e.g. Carbon Black MA8® from MITSUBISHI CHEMICAL), REGAL® 400R, MOGUL® L, ELFTEX® 320 from CABOT Co., or Carbon Black FW18, Special Black 250, Special Black 350, Special Black 550, PRINTEX® 25, PRINTEX® 35, PRINTEX® 55, PRINTEX® 90, PRINTEX® 150T from DEGUSSA. Additional examples of suitable pigments are disclosed in U.S. Pat. No. 5,389,133 (XEROX).

It is also possible to make mixtures of pigments. For example, for some inkjet ink applications, a neutral black inkjet ink is preferred and can be obtained e.g. by mixing a black pigment and a cyan pigment into the ink. Also pigments may be combined to enlarge the colour gamut of an ink set. The inkjet application may also require one or more spot colours. Silver and gold are often desired colours for making a product more attractive by giving it an exclusive appearance.

Also non-organic pigments may be present in the inks. Suitable pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black. However, care should be taken to prevent migration and extraction of heavy metals in food application. In the preferred embodiment no pigments are used which contain a heavy metal selected from the group consisting of arsenic, lead, mercury and cadmium.

Generally pigments are stabilized in the dispersion medium by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. However, the average pigment particle size for white inkjet inks including, for example, a titanium dioxide pigment, is preferably between 0.100 and 0.300 µm. An average particle size smaller than 0.050 µm is less desirable for decreased light-fastness, but mainly also because very small pigment particles or individual pigment molecules thereof may still be extracted in food packaging applications.

The pigment is generally used in a liquid radiation curable composition in an amount of 10 to 40 wt % based on the total weight of the composition. The pigment is preferably used in a pigment dispersion used for preparing the inkjet inks in an amount of 15 to 30 wt % based on the total weight of the pigment dispersion. In inkjet ink the pigment is preferably present in an amount of 0.1 to 20 wt %, preferably 1 to 10 wt % based on the total weight of the inkjet ink.

Dispersants

The dispersant is preferably a polymeric dispersant. Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:

statistically polymerized monomers (e.g. monomers A and B polymerized into ABBAABAB);
  alternating polymerized monomers (e.g. monomers A and B polymerized into ABABABAB);
  gradient (tapered) polymerized monomers (e.g. monomers A and B polymerized into AAABAABBABBB);
  block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Polymeric dispersants may have different polymer architecture including linear, comb/branched, star, dendritic (including dendrimers and hyperbranched polymers). A general review on the architecture of polymers is given by ODIAN, George, Principles of Polymerization, 4th edition, Wiley-Interscience, 2004, p. 1-18.

Comb/branched polymers have side branches of linked monomer molecules protruding from various central branch points along the main polymer chain (at least 3 branch points).

Star polymers are branched polymers in which three or more either similar or different linear homopolymers or copolymers are linked together to a single core.

Dendritic polymers include the classes of dendrimers and hyperbranched polymers. In dendrimers, with well-defined mono-disperse structures, all branch points are used (multi-step synthesis), while hyperbranched polymers have a plurality of branch points and multifunctional branches that lead to further branching with polymer growth (one-step polymerization process).

Suitable polymeric dispersants may be prepared via addition or condensation type polymerizations. Polymerization methods include those described by ODIAN, George, Principles of Polymerization, 4th edition, Wiley-Interscience, 2004, p. 39-606.

Addition polymerization methods include free radical polymerization (FRP) and controlled polymerization techniques. Suitable controlled radical polymerization methods include:

RAFT: reversible addition-fragmentation chain transfer;
ATRP: atom transfer radical polymerization
MADIX: reversible addition-fragmentation chain transfer process, using a transfer active xanthate;
Catalytic chain transfer (e.g. using cobalt complexes);
Nitroxide (e.g. TEMPO) mediated polymerizations;
Other suitable controlled polymerization methods include:
GTP: group transfer polymerization;
Living cationic (ring-opening) polymerizations;
Anionic co-ordination insertion ring-opening polymerization; and
Living anionic (ring-opening) polymerization.

Reversible addition-fragmentation transfer (RAFT): controlled polymerization occurs via rapid chain transfer between growing polymer radicals and dormant polymer chains. A review article on RAFT synthesis of dispersants with different polymeric geometry is given in QUINN J. F. et al., Facile Synthesis of comb, star, and graft polymers via reversible addition-fragmentation chain transfer (RAFT) polymerization, Journal of Polymer Science, Part A: Polymer Chemistry, Vol. 40, 2956-2966, 2002.

Group transfer polymerization (GTP): the method of GTP used for synthesis of AB block copolymers is disclosed by SPINELLI, Harry J, GTP and its use in water based pigment dispersants and emulsion stabilisers, Proc. of 20th Int. Conf. Org. Coat. Sci. Technol., New Platz, N.Y., State Univ. N.Y., Inst. Mater. Sci. p. 511-518.

The synthesis of dendritic polymers is described in the literature. The synthesis of dendrimers in NEWCOME, G. R., et al. Dendritic Molecules: Concepts, Synthesis, Perspectives. VCH: WEINHEIM, 2001. Hyperbranching polymerization is described by BURCHARD, W. Solution properties of branched macromolecules. *Advances in Polymer Science.* 1999, vol. 143, no. II, p. 113-194. Hyperbranched materials can be obtained by polyfunctional polycondensation as disclosed by FLORY, P. J. Molecular size distribution in three-dimensional polymers. VI. Branched polymer containing A-R-Bf-1-type units. *Journal of the American Chemical Society.* 1952, vol. 74, p. 2718-1723.

Living cationic polymerizations is e.g. used for the synthesis of polyvinyl ethers as disclosed in WO 2005/012444 (CANON), US 20050197424 (CANON) and US 20050176846 (CANON). Anionic co-ordination ring-opening polymerization is e.g. used for the synthesis of polyesters based on lactones. Living anionic ring-opening polymerization is e.g. used for the synthesis of polyethylene oxide macromonomers.

Free radical Polymerization (FRP) proceeds via a chain mechanism, which basically consists of four different types of reactions involving free radicals: (1) radical generation from non-radical species (initiation), (2) radical addition to a substituted alkene (propagation), (3) atom transfer and atom abstraction reactions (chain transfer and termination by disproportionation), and (4) radical-radical recombination reactions (termination by combination).

Polymeric dispersants having several of the above polymer compositions are disclosed in U.S. Pat. No. 6,022,908 (HP), U.S. Pat. No. 5,302,197 (DU PONT) and U.S. Pat. No. 6,528,557 (XEROX).

Suitable statistical copolymeric dispersants are disclosed in U.S. Pat. No. 5,648,405 (DU PONT), U.S. Pat. No. 6,245,832 (FUJI XEROX), U.S. Pat. No. 6,262,207 (3M), US 20050004262 (KAO) and U.S. Pat. No. 6,852,777 (KAO).

Suitable alternating copolymeric dispersants are described in US 20030017271 (AKZO NOBEL).

Suitable block copolymeric dispersants have been described in numerous patents, especially block copolymeric dispersants containing hydrophobic and hydrophilic blocks. For example, U.S. Pat. No. 5,859,113 (DU PONT) discloses AB block copolymers, U.S. Pat. No. 6,413,306 (DU PONT) discloses ABC block copolymers.

Suitable graft copolymeric dispersants are described in CA 2157361 (DU PONT) (hydrophobic polymeric backbone and hydrophilic side chains); other graft copolymeric dispersants are disclosed in U.S. Pat. No. 6,652,634 (LEXMARK), U.S. Pat. No. 6,521,715 (DU PONT).

Suitable branched copolymeric dispersants are described U.S. Pat. No. 6,005,023 (DU PONT), U.S. Pat. No. 6,031,019 (KAO), U.S. Pat. No. 6,127,453 (KODAK).

Suitable dendritic copolymeric dispersants are described in e.g. U.S. Pat. No. 6,518,370 (3M), U.S. Pat. No. 6,258,896 (3M), US 2004102541 (LEXMARK), U.S. Pat. No. 6,649,138 (QUANTUM DOT), US 2002256230 (BASF), EP 1351759 A (EFKA ADDITIVES) and EP 1295919 A (KODAK).

Suitable designs of polymeric dispersants for inkjet inks are disclosed in SPINELLI, Harry J., Polymeric Dispersants in Inkjet technology, *Advanced Materials,* 1998, Vol. 10, no. 15, p. 1215-1218.

The monomers and/or oligomers used to prepare the polymeric dispersant can be any monomer and/or oligomer found in the Polymer Handbook Vol. 1+2, 4th edition, edited by J. BRANDRUP et al., Wiley-Interscience, 1999.

Polymers useful as pigment dispersants include naturally occurring polymers, and specific examples thereof include: proteins, such as glue, gelatine, casein, and albumin; naturally occurring rubbers, such as gum arabic and tragacanth; glucosides such as saponin; alginic acid and alginic acid derivatives, such as propylene glycol alginate; and cellulose derivatives, such as methyl cellulose, carboxymethyl cellulose and ethylhydroxy cellulose; wool and silk, and synthetic polymers.

Suitable examples of monomers for synthesising polymeric dispersants include: acrylic acid, methacrylic acid, maleic acid (or there salts), maleic anhydride, alkyl(meth)acrylates (linear, branched and cycloalkyl) such as methyl (meth)acrylate, n-butyl(meth)acrylate, tert-butyl(meth)acrylate, cyclohexyl(meth)acrylate, and 2-ethylhexyl(meth)acrylate; aryl(meth)acrylates such as benzyl(meth)acrylate, and phenyl(meth)acrylate; hydroxyalkyl(meth)acrylates such as hydroxyethyl(meth)acrylate, and hydroxypropyl (meth)acrylate; (meth)acrylates with other types of functionalities (e.g. oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrene sulfonic acid; (meth)acrylonitrile; (meth)acrylamides (including N-mono and N,N-disubstituted) such as N-benzyl(meth)acrylamide; maleimides such as N-phenyl maleimide; vinyl derivatives such as vinyl alcohol, vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate. Typical condensation type polymers include polyurethanes, polyamides, polycarbonates, polyethers, polyureas, polyimines, polyimides, polyketones, polyester, polysiloxane, phenol-formaldehyde, urea-formaldehyde, melamine-formaldehyde, polysulfide, polyacetal or combinations thereof.

Suitable copolymeric dispersants are acrylic acid/acrylonitrile copolymer, vinyl acetate/acrylic ester copolymer, acrylic acid/acrylic ester copolymer, styrene/acrylic acid copolymer, styrene/methacrylic acid copolymer, styrene/methacrylic acid/acrylic ester copolymer, styrene/α-methylstyrene/acrylic acid copolymer, styrene/α-methylstyrene/acrylic acid/acrylic ester copolymer, styrene/maleic acid copolymer, styrene/maleic anhydride copolymer, vinylnaphthalene/acrylic acid copolymer, vinylnapthalene/maleic acid copolymer, vinyl acetate/ethylene copolymer, vinyl acetate/fatty acid/ethylene copolymer, vinyl acetate/maleic ester copolymer, vinyl acetate/crotonic acid copolymer, vinyl acetate/acrylic acid copolymer.

Suitable chemistries of copolymeric dispersants also include:
Copolymers which are the product of a condensation process of poly(ethylene imine) with a carboxylic acid terminated polyester (made by addition polymerization); and
Copolymers which are the product of a reaction of a multifunctional isocyanate with:
a compound monosubstituted with a group that is capable of reacting with an isocyanate, e.g. polyester;
a compound containing two groups capable of reacting with an isocyanate (cross-linker); and/or
a compound with at least one basic ring nitrogen and a group that is capable of reacting with an isocyanate group.

A detailed list of suitable polymeric dispersants is disclosed by M C CUTCHEON, Functional Materials, North American Edition, Glen Rock, N.J.: Manufacturing Confectioner Publishing Co., 1990, p. 110-129.

Suitable pigment stabilisers are also disclosed in DE 19636382 (BAYER), U.S. Pat. No. 5,720,802 (XEROX), U.S. Pat. No. 5,713,993 (DU PONT), WO 96/12772 (XAAR) and U.S. Pat. No. 5,085,689 (BASF).

One polymeric dispersant or a mixture of two or more polymeric dispersants may be present to improve the dispersion stability further. Sometimes surfactants can also be used as pigment dispersants, thus a combination of a polymeric dispersant with a surfactant is also possible.

The polymeric dispersant can be non-ionic, anionic or cationic in nature; salts of the ionic dispersants can also be used.

The polymeric dispersant has preferably a polymerization degree DP between 5 and 1000, more preferably between 10 and 500 and most preferably between 10 and 100.

The polymeric dispersant has preferably a number average molecular weight Mn between 500 and 30000, more preferably between 1500 and 10000.

The polymeric dispersant has preferably a weight average molecular weight Mw smaller than 100000, more preferably smaller than 50000 and most preferably smaller than 30000.

The polymeric dispersant has preferably a polymeric dispersity PD smaller than 2, more preferably smaller than 1.75 and most preferably smaller than 1.5.

Commercial examples of polymeric dispersants are the following:
DISPERBYK™ dispersants available from BYK CHEMIE GMBH;
SOLSPERSE™ dispersants available from NOVEON;
TEGO™ DISPERS™ dispersants from DEGUSSA;
EDAPLAN™ dispersants from MUNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH.

Particularly preferred dispersants for UV-curable pigmented dispersions are SOLSPERSE™ 32000, 35000 and 39000 dispersants from NOVEON.

The polymeric dispersant is preferably used in an amount of 2 to 600 wt %, more preferably 5 to 200 wt % based on the weight of the pigment.

Dispersion Synergists

The dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include SOLSPERSE™ 5000 and SOLSPERSE™ 22000 from NOVEON.

Particular preferred pigments for the magenta ink used are a diketopyrrolo-pyrrole pigment or a quinacridone pigment. Suitable dispersion synergists include those disclosed in EP 1790698 A (AGFA GRAPHICS) and EP 1790695 A (AGFA GRAPHICS).

In dispersing C.I. Pigment Blue 15:3, the use of a sulfonated Cu-phthalocyanine dispersion synergist, e.g. SOLSPERSE™ 5000 from NOVEON is preferred. Suitable dispersion synergists for yellow inkjet inks include those disclosed in EP 1790697 A (AGFA GRAPHICS).

Monomers and Oligomers

Any free radical polymerizable monomer or oligomer may be used in the liquid radiation curable compositions and inkjet inks according to the present inventions. A combination of monomers and oligomers may also be used. The monomers and/or oligomers may possess different degrees of functionality, and a mixture including combinations of mono-, di-, tri- and higher functionality monomers and/or oligomers may be used. The viscosity of the curable composition can be adjusted by varying the ratio between the monomers and oligomers.

In one preferred embodiment, the radiation curable composition preferably contains less than 15 wt % of monofunctional monomers based upon the total weight of the curable composition, more preferably less than less than 5 wt % of monofunctional monomers and most preferably no monofunctional monomers are present.

Any polymerizable compound commonly known in the art may be employed. Particularly preferred for use as a radiation curable compound in the radiation curable inkjet ink are monofunctional and polyfunctional acrylate monomers and oligomers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, vinyl ether ethoxy acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octadecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and propoxylated trimethylolpropane triacrylate.

Other higher functional acrylates include di-trimethylolpropane tetraacrylate, dipentaerythritol pentaacrylate, ethoxylated pentaerythritol tetraacrylate, methoxylated glycol acrylates and acrylate esters.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate, vinyl ether ethoxy methacrylate are preferred due to their relatively high sensitivity and higher adhesion to an ink-receiver surface.

Suitable polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, β-methylstyrene, p-methyl-β-methylstyrene, α-methylstyrene and p-methoxy-β-methylstyrene.

Suitable examples of vinylnaphthalene compounds are 1-vinylnaphthalene, β-methyl-1-vinylnaphthalene, β-methyl-1-vinylnaphthalene, 4-methyl-1-vinylnaphthalene and 4-methoxy-1-vinylnaphthalene.

Suitable examples of N-vinyl compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

A preferred class of monomers and oligomers which can be used in the liquid radiation curable compositions are vinyl ether acrylates such as those disclosed in U.S. Pat. No. 6310115 (AGFA), incorporated herein by reference. Particularly preferred compounds are 2-(2-vinyloxyethoxy)ethyl (meth)acrylate, most preferably the compound is 2-(2-vinyloxyethoxy)ethyl acrylate.

Inhibitors

The liquid radiation curable composition and curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, S110, S120 and S130) from Cytec Surface Specialties.

However, most preferably the inhibitor is a polymerizable inhibitor.

Since excessive addition of these polymerization inhibitors will lower the ink sensitivity to curing, it is preferred that the amount capable of preventing polymerization is determined prior to blending. The amount of a polymerization inhibitor is preferably between 0.5 and 10 wt %, more preferably between 1 and 5 wt %, and most preferably 4 wt % or less, all based upon the total weight of the ink.

Surfactants

The liquid radiation curable composition and curable inkjet ink may contain at least one surfactant. The surfactant can be anionic, cationic, non-ionic, or zwitter-ionic. The surfactant is usually added in a total quantity less than 20 wt % based on the total weight of the inkjet ink, more preferably in a total quantity less than 10 wt %, most preferably in an amount between 0.1 and 3 wt % and particularly preferably in an amount of 1 wt % or less all based upon the total weight of the ink. A combination of surfactants may be used.

For non-aqueous inkjet inks preferred surfactants are selected from fluoro surfactants (such as fluorinated hydrocarbons) and silicone surfactants. The silicones are typically siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

For radiation curable inkjet inks a fluorinated or silicone compound may be used as a surfactant, however, a cross-linkable surfactant would be preferred. It is therefore preferred to use a copolymerizable monomer having surface-active effects, for example, polyacrylate copolymers, silicone modified acrylates, silicone modified methacrylates, acrylated siloxanes, polyether modified acrylic modified siloxanes, fluorinated acrylates, and fluorinated methacrylates; these acrylates can be mono-, di-, tri- or higher functional (meth)acrylates.

Surfactants are known for use in inkjet inks to reduce the surface tension of the ink and to reduce the contact angle on the substrate, i.e. to improve the wetting of the substrate by the ink. On the other hand, the jettable fluid must meet stringent performance criteria in order to be adequately jettable with high precision, reliability and during an extended period of time. To achieve both wetting of the substrate by the ink and high jetting performance, typically, the surface tension of the ink is reduced by the addition of one or more surfactants. In the case of curable inkjet inks, however, the surface tension of the inkjet ink is not only determined by the amount and type of surfactant, but also by the polymerizable compounds, the polymeric dispersants and other additives in the ink composition.

Depending upon the application a surfactant can be used with a high, low or intermediate dynamic surface tension. Silicone surfactants are generally known to have low dynamic surface tensions while fluorinated surfactants are known to have higher dynamic surface tensions.

Useful commercially available fluorinated surfactants are for example the ZONYL™ range of fluoro-surfactants from DUPONT and the FLUORAD™ range of fluoro-surfactants from 3M. Other fluorinated surfactants are e.g. described in EP 1412438 A (3M).

Silicone surfactants are often preferred in curable inkjet inks, especially the reactive silicone surfactants, which are able to be polymerized together with the polymerizable compounds during the curing step.

Useful commercially available silicone surfactants are often polysiloxane surfactants, especially polyether modified polysiloxanes, preferably with one or more acrylate function in order to become polymerizable.

Examples of useful commercial silicone surfactants are those supplied by BYK CHEMIE GMBH (including BYK™-302, 307, 310, 331, 333, 341, 345, 346, 347, 348, UV3500, UV3510 and UV3530), those supplied by TEGO CHEMIE SERVICE (including TEGO RAD™ 2100, 2200N, 2250, 2300, 2500, 2600 and 2700), and EFKA™-3000 series (including EFKA™-3232 and EFKA™-3883) from EFKA CHEMICALS B.V.

Preparation of Radiation Curable Compositions

The average particle size and distribution is an important feature for inkjet inks. The inkjet ink may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can include particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat, and as much as possible under light conditions in which actinic radiation has been substantially excluded.

The inkjet ink may contain more than one pigment, and may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture include the mill grind and the milling media. The mill grind includes pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Inkjet Printing Processes

In one preferred embodiment the inkjet printing process consists of jetting one or more radiation curable inkjet inks according to the present invention onto a substrate.

In another preferred embodiment the inkjet printing process includes applying the liquid radiation curable composition according to the present invention to the substrate as a primer layer and/or as an outermost topcoat layer. The primer layer and/or outermost topcoat layer may be applied by inkjet printing or by any other suitable technique, such as flexographic printing or coating. This preferred embodiment preferably also includes jetting one or more radiation curable inkjet inks according to the present invention onto a substrate.

The liquid radiation curable composition applied as primer layer and/or outermost topcoat layer may include a white pigment, preferably titanium dioxide. In a preferred embodiment the primer layer includes a white pigment, such as titanium dioxide, while the outermost topcoat layer is a clear, colourless layer.

The inkjet print head normally scans back and forth in a transversal direction across the moving ink-receiver surface. Often the inkjet print head does not print on the way back. Bi-directional printing is preferred for obtaining a high areal throughput. A more preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the ink-receiver surface is transported under the inkjet print head.

The inkjet printing process according to the present invention can be used for manufacturing packaging materials, especially for food packaging applications. In general, a packaging material includes a substrate having adhered to its surface a cured layer of the liquid radiation curable compositions and/or inkjet inks. The packaging material preferably includes a substrate selected from the group consisting of polyolefin, metallized polyethylene terephthalate, polystyrene, polycarbonate, polyurethane, polyesters, polyamide, polyimide and metal.

Industrial Applicability

The liquid radiation curable compositions and inkjet inks are suitable for many printing applications. Low odor, low amounts of extractables and low amounts of migrateables from a cured layer are a desired property from many perspectives and for many applications.

The odor of a cured layer results from volatile compounds, such as organic solvents and unpolymerized monomers. Often photoinitiators do not contribute to a large extent to the undesired odor. However polymerization synergists, such as tertiary amines, may contribute significantly. Their contribution to the undesired odor can be minimized by using polymerizable amines, such as the tertiary aromatic amines included in the liquid radiation curable compositions and inkjet inks of the present invention. The odor is of importance, for example, in presenting a product with a point of sale display or in packaging food. At a point of sale, the display may emit an unfavorable smell which might deter potential customers. Odor of a cured layer almost always changes the smell properties of food in unfavorable way. If the change is sufficiently unpleasant the result is called "off odor".

For food packaging, the odor is one issue, but more important issues arise from the migration and extraction of compounds of the cured layer and the packaging material from perspective of health risks. Migration involves mass transfer (transport) of compounds which occurs in the cured layer and packaging substrate. This migration may cause a deterioration of the physical properties of the packaging material, but more importantly compounds may also further migrate into the food. The latter is usually referred to as "extraction" and the compounds extracted by the food from the packaging material are referred to as "extractables". It is common sense to exclude the use of toxic compounds as much as possible in manufacturing radiation curable compositions and inkjet inks. However, many compounds are not toxic per se, but become toxic when large amounts are consumed. Even water consumed in a large amount may become lethal for a human being. Minimizing the amount of migrateables and extractables is therefore a very important issue in food packaging considering the health hazards.

For the sake of completeness, it should be pointed out that migration can also occur in the other direction, i.e. from the food to the packaging material. This can have an effect on the nutritional quality of food if certain compounds, e.g. preservatives, are lost to a significant extent. But migration of compounds from the food to the packaging material may also cause a deterioration of the physical properties and the appearance of the packaging material. For example, colorants or fatty compounds extracted from food may result in a discoloration or staining of the packaging and is likely to be unattractive.

EXAMPLES

Materials

All materials used in the following examples were readily available from standard sources such as Aldrich Chemical Co. (Belgium) and Acros (Belgium) unless otherwise specified. The water used was deionized water.

PB15:4 is an abbreviation used for Hostaperm™ Blue P-BFS, a cyan pigment (C.I. Pigment Blue 15:4) available from CLARIANT.

SOLSPERSE™ 35000 is a polyethyleneimine-polyester hyperdispersant from NOVEON.

S35000 is a 35% Solution of SOLSPERSE™ 35000 in DPGDA.

GENORAD™ 16 is a polymerization inhibitor from RAHN AG.

DPGDA is dipropyleneglycoldiacrylate from SARTOMER.

TMPTA is trimethylolpropane triacrylate from CYTEC.

M600 is dipentaerythritol hexaacrylate available under the tradename of MIRAMER™ M600 from RAHN AG.

BYKSOL is 1% solution of BYK™ 333 in DPGDA. BYK™ 333 is a surfactant available from BYK CHEMIE GMBH.

INI-C1 was prepared according to example 2 of DE 3534645 (MERCK).

IRGACURE™ 2959 is 1-[4-(2-Hydroxyethoxy)phenyl]-2-hydroxy-2-methyl-1-propanone available from CIBA Specialty chemicals.

PET100 is a 100 μm unsubbed PET substrate with on the backside an antiblocking layer with antistatic properties available from AGFA-GEVAERT as P100C PLAIN/ABAS.

Measurement Methods

1. Curing Speed

The percentage of the maximum output of the lamp was taken as a measure for curing speed, the lower the number the higher curing speed. A sample was considered as fully cured at the moment scratching with a Q-tip caused no visual damage.

2. Determination Extractable Initiator & Co-Initiator

The extractables have been determined by HPLC for low molecular weight compounds and by GPC for polymeric compounds, such as e.g. hyperbranched initiators. Dibutyl phtalate was used as an internal standard to correct for differences in coating thickness, when the amount of extractables was calculated.

2.1 The HPLC-Method

A sample of 3 cm in diameter was taken from each coated and cured composition (cured at 100% for the samples having sensitivity below 100% and at 200% for samples having a sensitivity of above 100%). The sample was put in a 50 mL beaker and extracted 3 times with 3 mL acetonitrile using ultrasound for 3 minutes. The pooled extracts were adjusted to 10 mL and 10 μL was injected on a HPLC. An Alltime C18 5 m (150×3.2 mm) column equipped with an Alltima C18 (7.5×3.2 mm) precolumn was used (Alltech). A gradient elution from water/acetonitrile 20/80 to 100% acetonitrile over 12 minutes was used at a flow rate of 0.5 mL/min and at 30° C. The gradient was brought back to 20/80 water/acetonitrile over one minute and the column was equilibrated for 20 minutes using 20/80 water/acetonitrile. A 10 mg solution of each compound in 50 mL acetonitrile was prepared and diluted 10 times with acetonitrile to be used as reference sample to quantify the amount of extractables in each sample.

2.2 The GPC-Method

Solutions of 10 mg of each polymer in 10 mL THF were prepared as reference samples to quantify the amount of extractables in each sample.

A sample of 3 cm in diameter was taken of each coated and cured composition. The sample was put in a 50 mL beaker and extracted twice with 2 mL THF. The pooled extracts were adjusted to 5 mL and 100 μL of each extract was injected on a GPC. A 3× mixed B column set (300×7.5 mm, supplied by Polymer Laboratories) was used, using THF as eluent at a flow rate of 1 mL/min, a temperature of 40° C. and a RI-detector. All molecular weights were determined relative to polystyrene standards.

3. Viscosity

The viscosity of the formulations was measured using a Brookfield DV-II+ viscometer at 25° C. at 3 rotations per minute (RPM) using a CPE 40 spindle.

4. Average Particle Size

The average particle size of pigment particles in a non-aqueous inkjet ink was determined with a Brookhaven Instruments Particle Sizer BI90plus based upon the principle of dynamic light scattering. The ink or dispersion was diluted with ethyl acetate to a pigment concentration of 0.002 wt %. The measurement settings of the BI90plus were: 5 runs at 23° C., angle of 90°, wavelength of 635 nm and graphics=correction function.

For good ink jet characteristics (jetting characteristics and print quality) the average particle size of the dispersed particles should be less than 200 nm, preferably less than 150 nm.

5. Dispersion Stability

The dispersion stability was evaluated by comparing the particle size before and after a heat treatment of 7 days at 83° C. Pigmented inkjet inks exhibiting good dispersion stability have an in increase of the average particle size after heat treatment which is less than 10%.

Example 1

This example illustrates the synthesis of co-initiators suitable in the radiation curable compositions and inkjet inks of the invention.

Co-Initiator COINI-1

The synthesis was performed according to the following scheme:

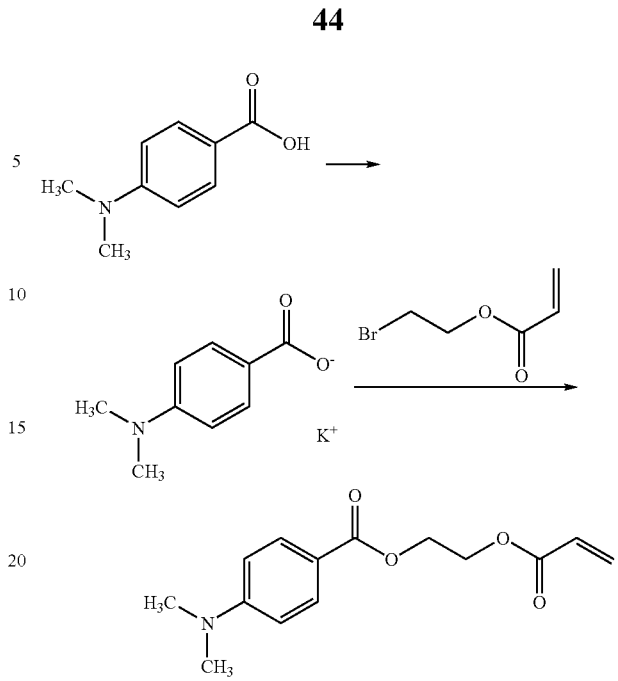

14.2 g (0.215 mol) of 85% KOH was dissolved in 100 mL ethanol. The temperature rose to 30° C. 30 g (0.178 mol) of 4-dimethylamino benzoic acid was added and the mixture was stirred for 90 minutes. The solvent was evaporated under reduced pressure. The residue was treated with 300 mL methyl tert. butyl ether, isolated by filtration and dried.

9.4 g (47 mmol) of 4-dimethylamino benzoic acid potassium salt was added to a solution of 10 g (56 mmol) of 2-bromoethyl acrylate in 40 mL dimethyl acetamide. 1 g of BHT was added and the mixture was heated to 60° C. for 2 hours. The reaction was allowed to cool down to room temperature. The formed potassium bromide was removed by filtration and 150 mL of methyl tert. butyl ether was added. The mixture was extracted with 150 mL of water. The organic fraction was isolated and dried over MgSO$_4$ and evaporated under reduced pressure. The residue was redissolved in 150 mL of methyl tert. butyl ether and extracted with 150 mL of a 1 M NaHCO$_3$-solution. The organic layer was dried over MgSO$_4$ and evaporated under reduced pressure. The residue was treated with water. COINI-1 precipitated from the medium, was isolated by filtration and dried. 4.3 g of COINI-1 was isolated.

Co-Initiator COINI-2

The synthesis was performed according to the following scheme:

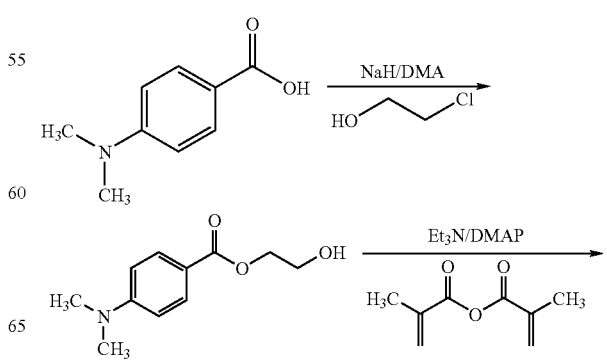

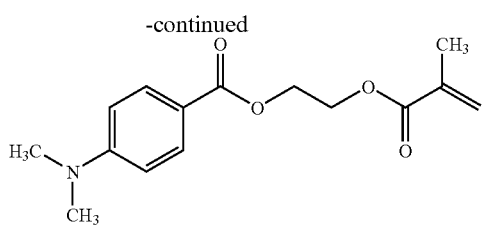

17.5 g (0.106 mol) of 4-dimethylamino benzoic acid was dissolved in 80 mL of dimethyl acetamide and added drop wise over 30 minutes to a suspension of 5.32 g (0.133 mol) of sodium hydride (60% in mineral oil) in 50 mL dimethyl acetamide. It became difficult to stir the suspension and an additional 30 mL of dimethyl acetamide was added. 7.2 mL (8.64 g, 0.107 mol) of 2-chloro-ethanol was added and the reaction mixture was heated to 105° C. The reaction was allowed to continue 16 hours at 105° C. The mixture was allowed to cool down to room temperature and the formed sodium chloride was removed by filtration. The solvent was removed under reduced pressure and the residue was crystallized from 400 mL of methanol/water 1/7. The crude 2-hydroxyethyl-(4-dimethylamino benzoate) was isolated by filtration and recrystallized from 200 mL of methanol/water 1/3. 15 g of 2-hydroxyethyl-(4-dimethylamino benzoate) was isolated (m.p. 88-90°).

6.0 g (28.6 mmol) of 2-hydroxyethyl-(4-dimethylamino benzoate) was dissolved in 100 mL of methylene chloride. 5.24 g (34 mmol) of methacrylic anhydride, 0.12 g of BHT and 0.17 g of 4-dimethylaminopyridine were added. A solution of 3.43 g (34 mmol) of triethyl amine in 20 mL of methylene chloride was added. The reaction was allowed to continue for 30 minutes at room temperature. The mixture was extracted twice with 50 mL of 2N HCl. The organic fraction was dried over Na$_2$SO$_4$ and evaporated under reduced pressure. The residue was dissolved in 100 mL of methanol, while heating. 300 mL of water was added and the co-initiator COINI-2 precipitated from the medium. COINI-2 was isolated by filtration and dried. 7.6 g of COINI-2 was isolated (m.p. 52-54° C.)

Co-Initiator COINI-3

The synthesis was performed in three steps. The first step of the synthesis was performed according to the following scheme:

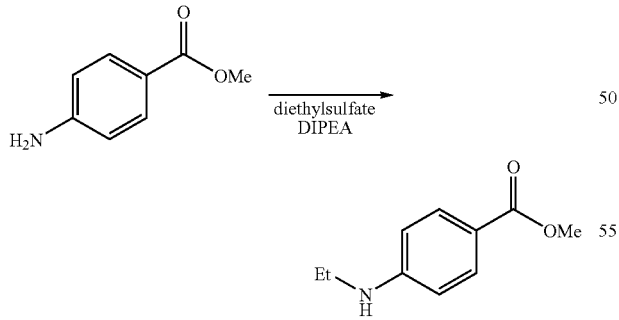

A mixture of 25.0 g (0.165 mol) 4-aminobenzoic acid methyl ester, 21.75 mL (0.165 mol) of diethyl sulfate and 30 mL (0.174 mol) of diisopropyl ethyl amine was heated to 120° C. for 1 hour. The reaction was exothermic and the temperature rose to 140° C. The mixture was allowed to cool down to room temperature and 100 mL of water was added. 4-(ethylamino) benzoic acid methyl ester crystallized over night, was isolated by filtration, washed 3 times with water and dried. The crude 4-(ethylamino)benzoic acid methyl ester was recrystallized from methanol. 14.44 g of 4-(ethylamino)benzoic acid methyl ester was isolated (m.p. 132-135° C.).

The second step of the synthesis was performed according to the following scheme:

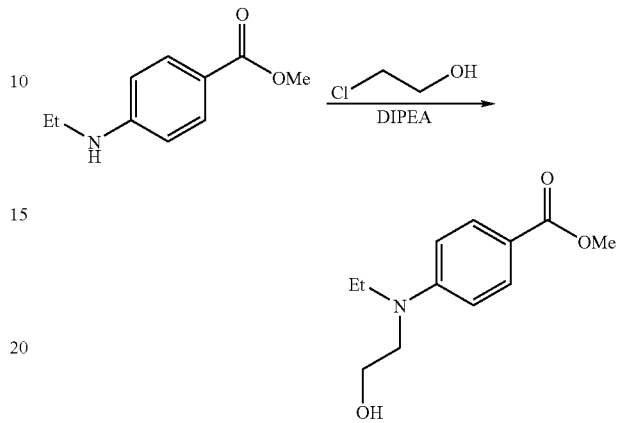

A mixture of 15 g (84 mmol) of 4-(ethylamino)benzoic acid methyl ester, 15 mL (0.224 mol) of ethylene chlorohydrine and 14.5 mL (84 mmol) of diisopropyl ethyl amine was refluxed for 5 hours. During the reflux, the temperature rose from 105° C. to 140° C. The reaction mixture was allowed to cool down to room temperature and 100 mL of water and 250 mL of ethyl acetate was added. After extraction, the organic fraction was isolated, washed 3 times with 50 mL of water, once with 50 mL of brine and dried over MgSO$_4$. The solvent was removed under reduced pressure and N-ethyl-N-(2-hydroxyethyl)-4-aminobenzoic acid methyl ester was isolated by preparative column chromatography on Kieselgel 60 (Aldrich) using cyclohexane/ethyl acetate 1/1 as eluent. 5.0 g of N-ethyl-N-(2-hydroxyethyl)-4-aminobenzoic acid methyl ester was isolated (m.p. 61-64° C.)

The third step of the synthesis was performed according to the following scheme:

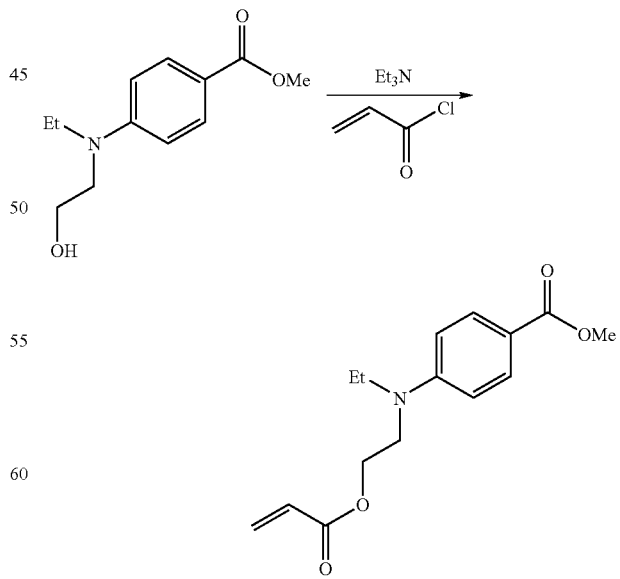

4.3 g (19 mmol) of N-ethyl-N-(2-hydroxyethyl)-4-aminobenzoic acid methyl ester was dissolved in 20 mL of methylene chloride. 2.9 mL (20 mmol) of triethyl amine was added. 1.8 g (20 mmol) of acryloyl chloride was added drop wise and the reaction was allowed to continue for 2 hours at room temperature. The reaction proved to be incomplete based on a TLC analysis. An additional 0.3 mL of triethyl amine and 0.16 mL of acryloyl chloride were added and the reaction was allowed to continue for 2 hours at room temperature. Still, the reaction proved to be incomplete. An additional 1.5 mL of triethyl amine and 0.8 mL of acryloyl chloride were added and the reaction was allowed to continue over night at room temperature. The reaction mixture was extracted twice with 50 mL of 1N HCl. The organic fraction was dried over MgSO$_4$ and evaporated under reduced pressure. The crude co-initiator COINI-3 was purified by preparative column chromatography. 1.4 g of COINI-3 was isolated.

Co-Initiator COINI-4

The synthesis was performed in three steps. The first step of the synthesis was performed according to the following scheme:

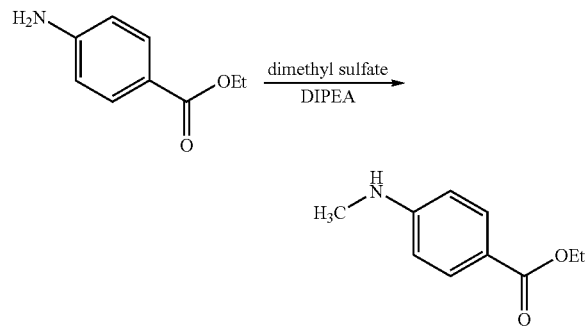

68.15 g (0.412 mol) of 4-aminobenzoic acid ethyl ester was suspended in 86 mL (0.5 mol) diisopropyl ethyl amine and 60.0 g (45 mL, 0.474 mol) dimethyl sulfate was added drop wise. During the addition, the temperature rose to 95° C. The reaction is allowed to continue for 1 hour at 120° C. The reaction mixture was allowed to cool down to room temperature and 300 mL of water was added. The mixture was allowed to stand over night. The precipitated residue was isolated and treated with 250 mL of ethyl acetate. The solution in ethyl acetate was extracted twice with 100 mL of water, dried over MgSO$_4$ and evaporated under reduced pressure. 4-methylaminobenzoic acid ethyl ester was purified by preparative column chromatography on Kieselgel 60 (Aldrich), using cyclohexane/ethyl acetate 4/1 as eluent. 36.3 g 4-methylaminobenzoic acid methyl ester was isolated (m.p. 66-67° C.).

The second step of the synthesis was performed according to the following scheme:

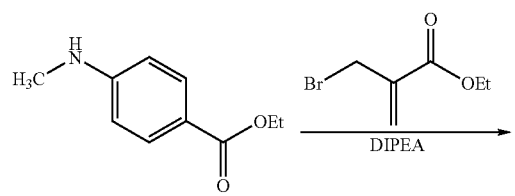

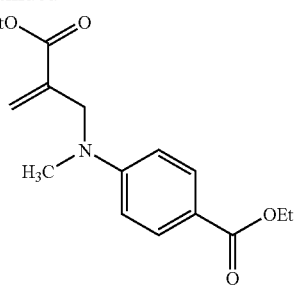

6.00 g (33.48 mmol) of 4-methylaminobenzoic acid ethyl ester was dissolved in 12.98 g (17.1 mL, 100.4 mmol) of diisopropyl ethyl amine and 5.5 mL of methylene chloride. 2.31 g (1.55 mL, 12.0 mmol) of 2-bromomethyl-acrylic acid ethyl ester was added drop wise. The reaction was allowed to continue for 2 hours at room temperature. 50 mL of water was added and the mixture was extracted 3 times with 50 mL ethyl acetate. The pooled organic fractions were dried over MgSO$_4$ and evaporated under reduced pressure. The crude co-initiator COINI-4 was purified by preparative column chromatography on Kieselgel 60 (Aldrich), using cyclohexane/ethyl acetate 8/1 as eluent. 2.81 g of COINI-4 was isolated.

Example 2

This example illustrates the reduction in extractables of the photoinitiating system from liquid radiation curable compositions including a diffusion hindered photoinitiator and a polymerizable co-initiator according to the present invention.

Preparation of liquid radiation curable compositions

The comparative liquid radiation curable compositions C-1 and C-2 and the inventive liquid radiation curable compositions INV-1 to INV-5 were prepared by mixing the components according to Table 5. The weight % (wt %) of the components were based on the total weight of the liquid radiation curable composition.

TABLE 5

| wt % of | INV-1 | INV-2 | INV-3 | INV-4 | INV-5 | C-1 | C-2 |
|---|---|---|---|---|---|---|---|
| DPGDA | 39.0 | 27.0 | 34.5 | 42.5 | 41.5 | 45.0 | 43.5 |
| TMPTA | 40.0 | 40.0 | 40.0 | 40.0 | 40.0 | 40.0 | 40.0 |
| INI-B1 | 18.0 | — | — | — | — | — | — |
| INI-B11 | — | 20.0 | — | — | — | — | — |
| INI-B5 | — | — | 15.0 | — | — | — | — |
| INI-C12 | — | — | — | 10.0 | — | — | — |
| INI-C13 | — | — | — | — | 10.0 | — | — |
| Comp-INI-1 | — | — | — | — | — | 7.0 | — |
| Comp-INI-2 | — | — | — | — | — | — | 7.5 |
| COINI-1 | 9.5 | 11.0 | 8.5 | 5.5 | 6.5 | — | — |
| Comp-COINI-1 | — | — | — | — | — | 6.0 | 7.0 |
| Dibutyl phtalate | 2.0 | 2.0 | 2.0 | 2.0 | 2.0 | 2.0 | 2.0 |

The following compounds were used as comparative compounds:

Comp-INI-1:

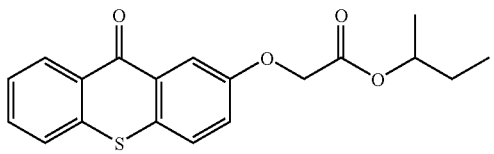

Comp-INI-2:

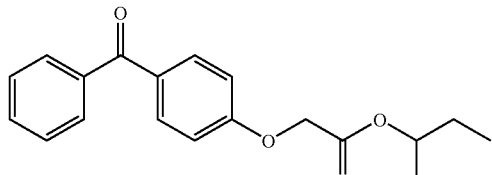

Comp-COINI-1 (available as GENOCURE™ EHA from RAHN AG):

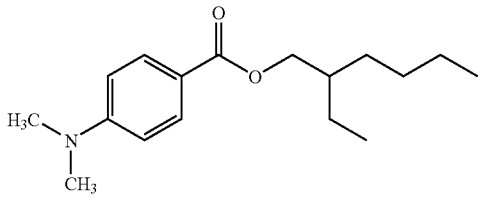

The hyperbranched photoinitiator INI-B1 was prepared as disclosed in EP 1616920 A (AGFA). The generalized formula of INI-B1 can be represented by $PG_{17}BP_{9.6}MEEA_{7.4}$, i.e. a hyperbranched polyglycidol having 17 hydroxyl endgroups on average, wherein 9.6 endgroups on average were esterified with the benzophenone derivative I and 7.4 endgroups on average were esterified with methoxy-ethoxy-ethoxy-acetic acid.

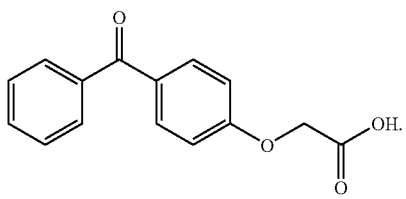

benzophenone derivative I

The hyperbranched photoinitiator INI-B11 was prepared in a similar way as disclosed in EP 1616920 A (AGFA). The generalized formula of INI-B11 can be represented by $PG_{33}TA_{15}MEEA_{22}$, a hyperbranched polyglycidol having 33 hydroxyl endgroups on average, where 11 endgroups on average were esterified with the thioxanthone derivative I and 22 endgroups on average were esterified with methoxy-ethoxy-ethoxy-acetic acid.

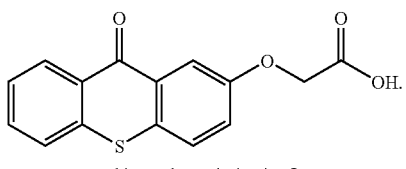

thioxanthone derivative I

The photoinitiator INI-B5 was prepared according to example 6 of WO 03/033452 (COATES BROTHERS).

The initiator INI-C12 was prepared according to the following synthesis scheme:

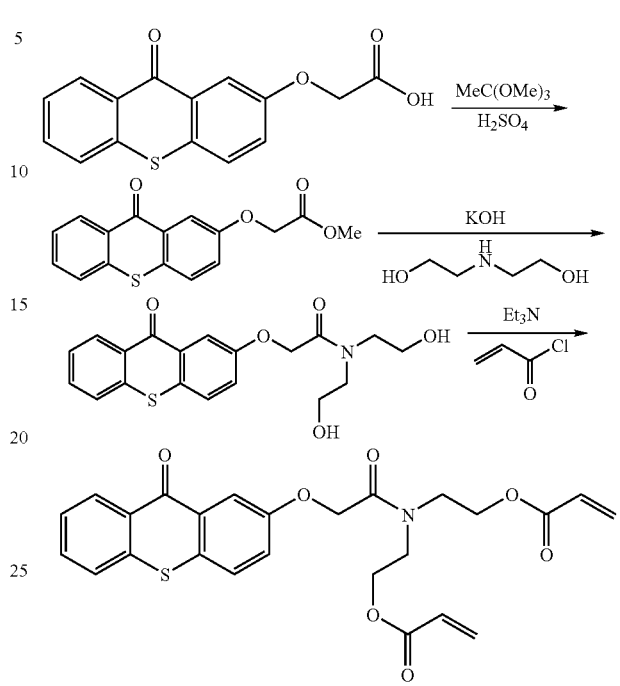

The starting thioxanthone was prepared according to EP 1380580 (Great Lakes Limited). 11.44 g (0.04 mol) of the starting thioxanthone was added to 130 mL methanol. 6.36 g (0.06 mol) trimethyl orthoacetate and 3.33 mL sulfuric acid were added. The reaction was allowed to continue for 2 hours at 60° C. The reaction mixture was allowed to cool down to room temperature and the methylester precipitated from the medium. The intermediate thioxanthone ester was isolated by filtration, washed twice with 25 mL methanol and dried. 5.4 g (45%) of the intermediate ester was isolated (m.p. 124-126° C.)

A mixture of 5 g (16.6 mmol) of the intermediate ester, 6.3 g (60 mmol) of diethanol amine and 0.05 g KOH was heated to 105° C. for 2 hours. The reaction mixture was allowed to cool down to 30° C. and added portion wise to 100 mL water/ice. The mixture was stirred for 10 minutes and the precipitated thioxanthone amide was isolated by filtration. The precipitated intermediate amide was treated with 50 mL water, containing 2% acetic acid. The intermediate was isolated by filtration for a second time, washed with water/methanol 8/2 and dried. 4.35 g (70%) of the intermediate amide was isolated.

3.73 g (10 mmol) of the intermediate amide was dissolved in 20 mL dimethyl acetamide. 2.5 mg 1,3-dinitrobenzene, 3.5 mL (25 mmol) triethylamine and 0.1 mL pyridine were added and the mixture was cooled to −15° C. A solution of 1.99 g (22 mmol) acryloyl chloride in 5 mL ethyl acetate was added over 25 minutes, while keeping the temperature below −5° C. The reaction was continued at 5° C. for 5 hours. The reaction mixture was poured into a mixture of 100 mL water and 3 mL acetic acid and extracted with 150 mL ethyl acetate. The ethyl acetate fraction was washed twice with 75 mL water, dried over $MgSO_4$ and evaporated under reduced pressure. The crude INI-C12 was purified by preparative column chromatography using methylene chloride/methanol 97/3 as eluent. 3 g (62%) of INI-C12 was isolated.

The initiator INI-C13 was prepared according to the following synthesis scheme:

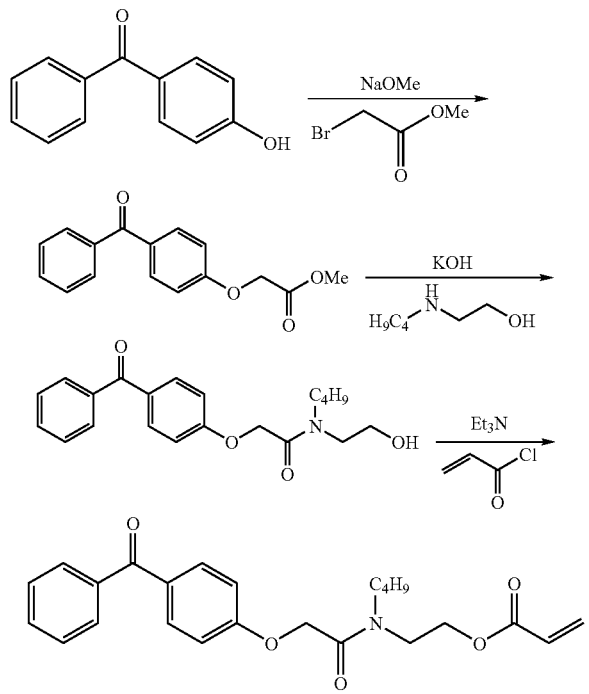

137 g (0.69 mol) 4-hydroxybenzophenone was dissolved in 650 mL dimethyl acetamide. 166 mL of a 5.4 molar solution of sodium methanolate in methanol was added. The reaction mixture was stirred for 30 minutes. 126.7 g (0.83 mol) bromoacetic acid methyl ester was added drop wise at 40° C. The reaction was allowed to continue for 1 hour at 40° C. The reaction mixture was allowed to cool down to room temperature and poured into 1 L ice/water, containing 20 mL acetic acid. The intermediate benzophenone ester precipitated from the medium, was isolated by filtration, washed with water and dried. 181 g (97%) of the intermediate ester was isolated (m.p. 100-102° C.)

A mixture of 10.8 g (40 mmol) of the benzophenone ester, 17.6 g (150 mmol) n.-butyl-ethanolamine and 0.1 g KOH was heated to 105° C. for 2 hours. The mixture was allowed to cool down to 25° C. and slowly added to 100 mL ice/water. The oily residue was treated for a second time with 50 mL ice/water and isolated again. The oily residue was dissolved in 50 mL ethyl acetate and extracted three times with 50 mL water and once with a 1% acetic acid solution in water. The organic fraction was dried over MgSO₄ and evaporated under reduced pressure. The intermediate amide was sufficiently pure to be used without further purification. 12.4 g (87%) of the crude benzophenone amide was isolated.

3.56 g (10 mmol) of the intermediate benzophenone amide was dissolved in 25 mL ethyl acetate. The reaction mixture was cooled down to -12° C. and 1 g (11 mmol) acryloyl chloride was added over 10 minutes while keeping the temperature below -10° C. 15.5 mL (11 mmol) triethyl amine was added drop wise, while keeping the temperature below -5° C. The reaction was allowed to continue for 5 hours at room temperature. 100 mL ethyl acetate was added and the reaction mixture was extracted twice with 100 mL water. The organic fraction was dried over MgSO₄ and evaporated under reduced pressure. The crude INI-C13 was purified by preparative column chromatography, using methylene chloride/methanol 98/2 as eluent. 1.15 g (28%) of INI-C13 was isolated.

Evaluation of the Liquid Radiation Curable Compositions

The comparative liquid radiation curable compositions C-1 and C-2 and the inventive liquid radiation curable compositions INV-1 to INV-5 were coated on PET100 using a bar coater and a 10 μm wired bar. Each coated sample was cured using a Fusion DRSE-120 conveyer, equipped with a Fusion VPS/I600 lamp (D-bulb), which transported the samples under the UV-lamp on a conveyer belt at a speed of 20 m/min.

The curing speed was determined. A curing speed of more then 100% means that the transport speed of the conveyer belt was slowed down to 10 m/min.

The viscosity, curing speed and the amount of extractables from a cured layer are listed in Table 6.

TABLE 6

| Sample | Viscosity (mPa · s) | Curing speed | Extractable initiator (mg/m²) | Extractable co-initiator (mg/m²) |
|---|---|---|---|---|
| INV-1 | 85 | 65 | 0 | 0 |
| INV-2 | 92 | 65 | 0 | 0 |
| INV-3 | 68 | 60 | 0 | 0 |
| INV-4 | 37 | 160 | 0 | 0 |
| INV-5 | 35 | 180 | 0 | 0 |
| C-1 | 31 | 110 | 19 | 2 |
| C-2 | 30 | 130 | 39 | 13 |

From Table 6, it becomes apparent that all inventive samples have a strongly reduced amount of extractables, while keeping a good to reasonable curing speed when cured under air and an acceptable viscosity for ink jet applications.

Example 3

This example illustrates the good shelf-life (dispersion stability) of an ink prepared in accordance with the present invention, using the aromatic tertiary amine in stead of an aliphatic tertiary amine.

Preparation of Comparative Initiator Comp-INI-3

The comparative initiator Comp-INI-3 was prepared according to the following synthesis scheme:

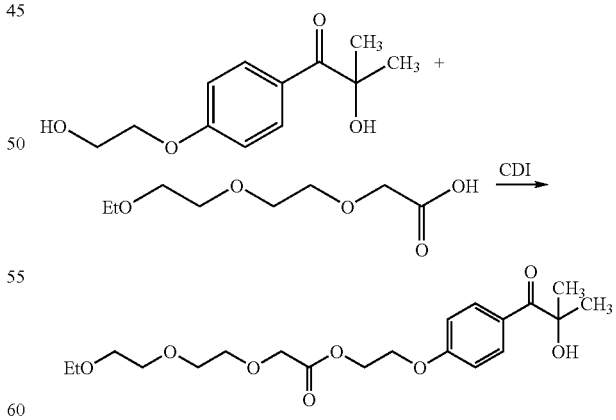

To a solution of 2-[2-(2-methoxyethoxy)ethoxy]acetic acid (2.7 g, 0.015 mol) in N,N-dimethylacetamide (50 mL), 1,1-carbonyldiimidazole (3.3 g, 0.0165 mol) was added in portions. The reaction mixture was allowed to stir for 30 minutes at room temperature resulting in the formation of the imidazole intermediate.

IRGACURE™ 2959 (3.4 g, 0.015 mol) was added and the mixture was stirred for about 48 hours at room temperature.

The reaction mixture was cooled to −10° C., diluted with distilled water (100 mL) and extracted with methyl-tert-butylether (2×150 mL). The organic layer was separated and dried over MgSO$_4$.

After evaporation of the solvent, the product was purified on a PROCHROM™ LC80 Column (Novasep, Inc) using n-hexane/ethyl acetate (50/50) as eluent, to afford 2.4 g of a clear oil.

Preparation of Comparative Co-Initiator Comp-COINI-2

The comparative initiator Comp-INI-3 was prepared according to the following synthesis scheme:

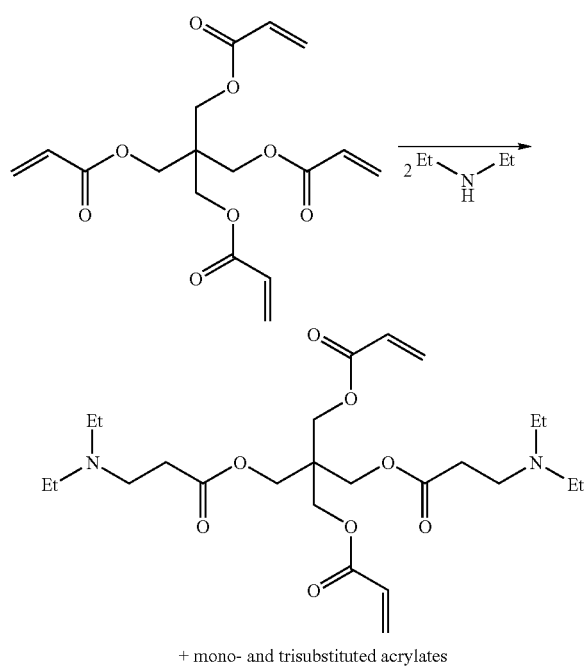

+ mono- and trisubstituted acrylates

A reaction mixture containing pentaerythritol tetraacrylate (21.1 g, 0.06 mol) and 2,6-di-tert-butyl-4-methylfenol (0.1 g, 0.0006 mol) was heated at 50° C.

Diethyl amine (8.8 g, 0.12 mol) was added drop wise while the temperature was maintained between 50° C. and 55° C.

The mixture was stirred for about 8 hours.

The reaction mixture was cooled to room temperature to yield 28.2 g of a yellow oil Preparation of the Pigment Dispersion CPD1

A concentrated pigment dispersion CPD1 was prepared by mixing for 30 minutes the components according to Table 7 in a 20 L vessel. The vessel was then connected to a Bachofen DYNOMILL ECM Pilot mill having an internal volume of 1.5 L filled for 63% with 0.4 mm yttrium stabilized zirconia beads. The mixture was circulated over the mill for 2 hours at a flow rate of about 2 L per minute and a rotation speed in the mill of about 13 m/s. The dispersion was then discharged into a 10 L vessel.

TABLE 7

| Component | Quantity |
|---|---|
| PB15:4 | 1400 g |
| S35000 | 4000 g |
| Genorad ™ 16 | 70 g |
| DPGDA ™ | 1530 g |

The average particle size of the concentrated pigment dispersion CPD1 was 126 nm.

Preparation of the Liquid Radiation Curable Compositions

The comparative liquid radiation curable compositions C-3 to C-8 and the inventive liquid radiation curable compositions INV-6 and INV-7 were prepared by mixing the components according to Table 8. The weight% (wt %) of the components were based on the total weight of the liquid radiation curable composition.

TABLE 8

| wt % of | INV-6 | INV-7 | C-3 | C-4 | C-5 | C-6 | C-7 | C-8 |
|---|---|---|---|---|---|---|---|---|
| CPD1 | 15.0 | 15.0 | 15.0 | 15.0 | 15.0 | 15.0 | 15.0 | 15.0 |
| DPGDA | 52.0 | 47.0 | 52.0 | 47.0 | 52.0 | 47.0 | 52.0 | 47.0 |
| M600 | 20.0 | 20.0 | 20.0 | 20.0 | 20.0 | 20.0 | 20.0 | 20.0 |
| INI-C1 | 5.0 | 5.0 | — | — | 5.0 | 5.0 | — | — |
| Comp-INI-3 | — | — | 5.0 | 5.0 | — | — | 5.0 | 5.0 |
| COINI-1 | 5.0 | 10.0 | 5.0 | 10.0 | — | — | — | — |
| Comp-COINI-2 | — | — | — | — | 5.0 | 10.0 | 5.0 | 10.0 |
| BYKSOL | 3.0 | 3.0 | 3.0 | 3.0 | 3.0 | 3.0 | 3.0 | 3.0 |

Evaluation of the Liquid Radiation Curable Compositions

The comparative liquid radiation curable compositions C-3 to C-8 and the inventive liquid radiation curable compositions INV-6 and INV-7 were coated on PET100 using a bar coater and a 10 μm wired bar. Each coated sample was cured using a Fusion DRSE-120 conveyer, equipped with a Fusion VPS/I600 lamp (D-bulb), which transported the samples under the UV-lamp on a conveyer belt at a speed of 20 m/min. The curing was performed under a nitrogen inerting condition.

For curing under a nitrogen inerting condition, the coated substrate was mounted on the metal plate and on top a metal frame was placed of 1 cm height with a non UV-absorbing quartz glass window, and then filled during 30 seconds with pure nitrogen gas before the coating was placed on the conveyer belt.

The comparative liquid radiation curable compositions C-3 to C-8 and the inventive liquid radiation curable compositions INV-6 and INV-7 were given a heat treatment of 7 days at 83° C. The viscosity and dispersion stability were determined and are given in Table 9.

TABLE 9

| Sample | Viscosity (mPa · s) | Dispersion stability |
|---|---|---|
| INV-6 | 36 | 0% |
| INV-7 | 41 | 0% |
| C-3 | 41 | 0% |
| C-4 | 45 | 0% |
| C-5 | 56 | 0% |
| C-6 | 80% solid | 10% |
| C-7 | 80% solid | 8% |
| C-8 | 80% solid | 31% |

From Table 9, it should be clear that the inventive samples INV-6 and INV-7 exhibited still very low viscosity after heat treatment, while some of the comparative samples were almost 80% solidified. After a heat treatment, no increase in particle size was observed for inventive radiation curable inks INV-6 and INV-7.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid radiation curable composition comprising:
    a photoinitiating system consisting of:
        one or more photoinitiators selected from the group consisting of non-polymeric di- or multifunctional initiators, oligomeric or polymeric initiators, and polymerizable initiators; and
        one or more polymerizable co-initiators; wherein
    at least one of the polymerizable co-initiators is a co-initiator according to Formula (I):

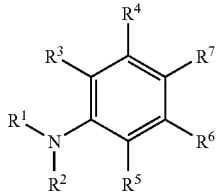

Formula (I)

wherein,
    $R^1$ and $R^2$ are independently selected from the group consisting of an alkyl group, an alkenyl group, an alkynyl group, an aralkyl group, an alkaryl group, an aryl group, and a heteroaryl group;
    $R^3$ to $R^6$ are independently selected from the group consisting of hydrogen, an alkyl group, an alkenyl group, an alkynyl group, an acyl group, a thioalkyl group, an alkoxy group, a halogen, an aralkyl group, an alkaryl group, an aryl group, and a heteroaryl group;
    $R^7$ is selected from the group consisting of hydrogen, an aldehyde group, a ketone group, an ester group, an amide group, an acyl group, a thioalkyl group, an alkoxy group, a halogen, a nitrile group, a sulphonate group, a sulphonamide group, an alkyl group, an alkenyl group, an alkynyl group, an aralkyl group, an alkaryl group, an aryl group, and a heteroaryl group;
    $R^1$ and $R^2$, $R^1$ and $R^3$, $R^2$ and $R^5$, $R^3$ and $R^4$, $R^4$ and $R^7$, $R^5$ and $R^6$, and $R^6$ and $R^7$ may represent the necessary atoms to form a 5 to 8 membered ring; and with the proviso that the aromatic amine has at least one alpha hydrogen;
    at least one of $R^1$ to $R^7$ includes a polymerizable ethylenically unsaturated functional group;
    if $R^1$ to $R^6$ includes the polymerizable ethylenically unsaturated functional group, then the polymerizable ethylenically unsaturated functional group is selected from the group consisting of acrylate, substituted acrylate, methacrylate, styrene, acrylamide, methacrylamide, allyl ester, allyl ether, vinyl ester, vinyl ether, fumarate, maleate, maleimide, and vinyl nitrile; and
    if $R^7$ includes the polymerizable ethylenically unsaturated functional group, then the polymerizable ethylenically unsaturated functional group is selected from the group consisting of acrylate, substituted acrylate, methacrylate, styrene, acrylamide, methacrylamide, fumarate, maleate, maleimide, and vinyl nitrile.

2. The liquid radiation curable composition according to claim 1, wherein $R^7$ represents an electron withdrawing group selected from the group consisting of an aldehyde, a ketone, an ester, and an amide.

3. The liquid radiation curable composition according to claim 1, wherein the at least one polymerizable co-initiator corresponds to Formula (II):

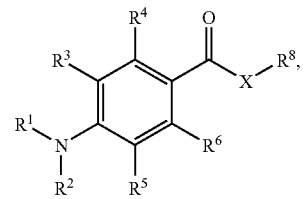

Formula (II)

wherein
    $R^1$ to $R^6$ have the same meaning as defined in claim 1;
    X is selected from the group consisting of O, S, and $NR^9$;
    $R^8$ and $R^9$ are independently selected from the group consisting of hydrogen, an alkyl group, an alkenyl group, an alkynyl group, an aralkyl group, an alkaryl group, an aryl group, and a heteroaryl group;
    $R^1$ and $R^2$, $R^1$ and $R^3$, $R^2$ and $R^5$, $R^3$ and $R^4$, $R^5$ and $R^6$, $R^4$ and $R^8$, $R^6$ and $R^8$, and $R^8$ and $R^9$ may represent the necessary atoms to form a 5 to 8 membered ring;
    at least one of $R^1$ to $R^6$ and $R^8$ includes a polymerizable ethylenically unsaturated functional group;
    if $R^1$ to $R^6$ includes the polymerizable ethylenically unsaturated functional group, then the polymerizable ethylenically unsaturated functional group is selected from the group consisting of acrylate, substituted acrylate, methacrylate, styrene, acrylamide, methacrylamide, allyl ester, allyl ether, vinyl ester, vinyl ether, fumarate, maleate, maleimide, and vinyl nitrile; and
    if $R^8$ includes the polymerizable ethylenically unsaturated functional group, then the polymerizable ethylenically unsaturated functional group is selected from the group consisting of acrylate, substituted acrylate, methacrylate, styrene, acrylamide, methacrylamide, fumarate, maleate, maleimide, and vinyl nitrile.

4. The liquid radiation curable composition according to claim 1, wherein $R^3$, $R^4$, $R^5$, and $R^6$ all represent hydrogen.

5. The liquid radiation curable composition according to claim 3, wherein $R^3$, $R^4$, $R^5$, and $R^6$ all represent hydrogen.

6. The liquid radiation curable composition according to claim 4, wherein the at least one polymerizable co-initiator corresponds to Formula (III):

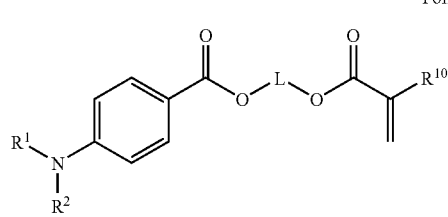

Formula (III)

wherein
    $R^1$ and $R^2$ are independently selected from the group consisting of methyl, ethyl, propyl, and butyl;
    L represents a divalent linking group including at least one carbon atom and/or hydrogen atom; and
    $R^{10}$ represents hydrogen, methyl, ethyl, propyl, or butyl.

7. The liquid radiation curable composition according to claim 1, wherein the at least one polymerizable co-initiator is selected from the group consisting of

57
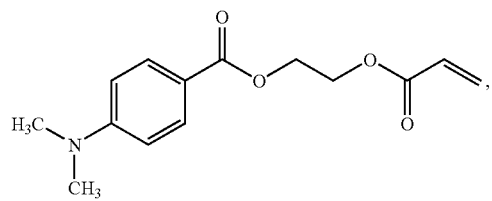
58
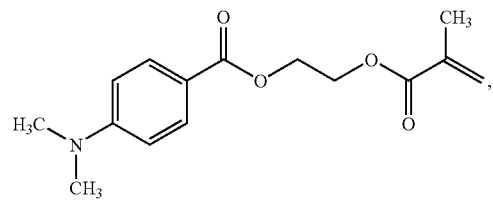
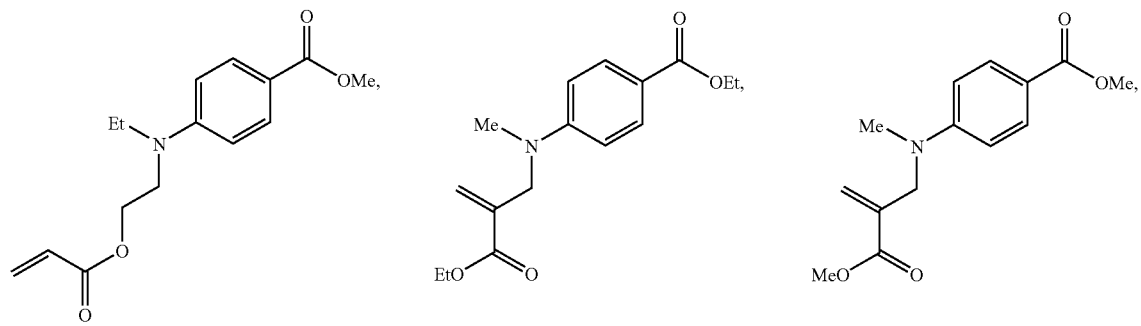
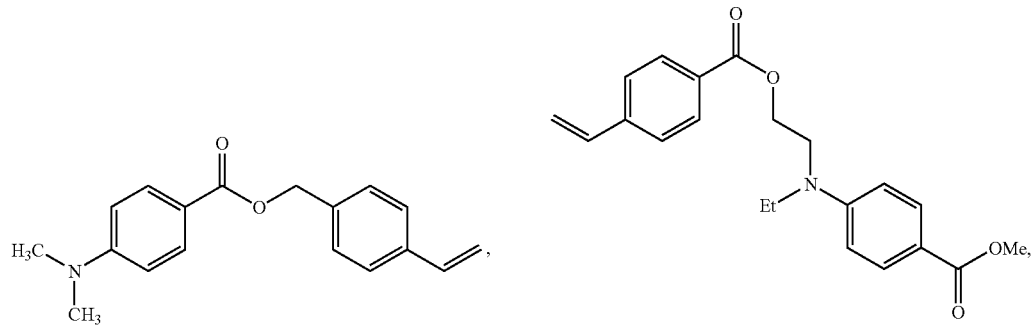
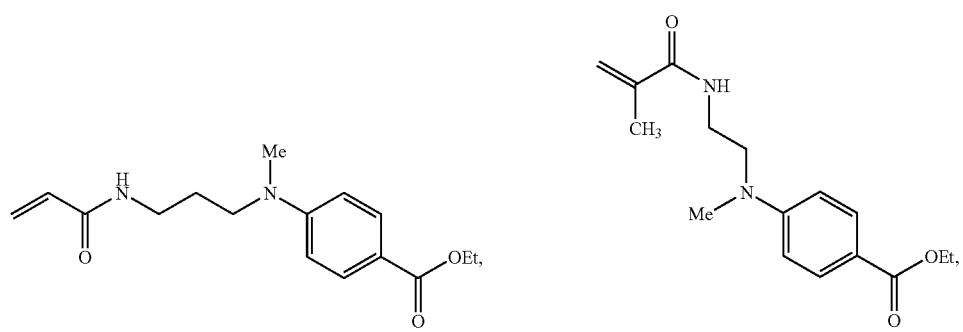
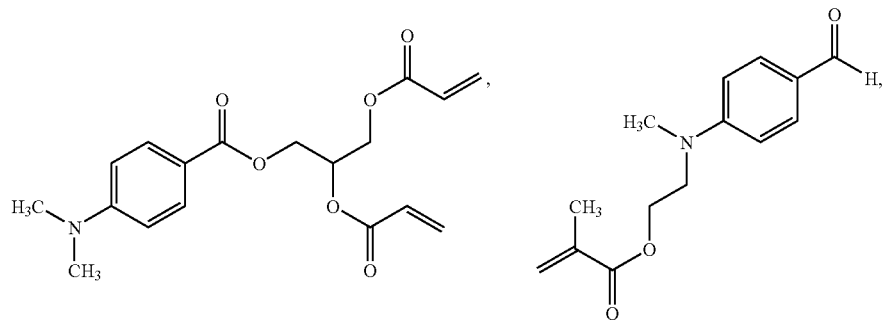

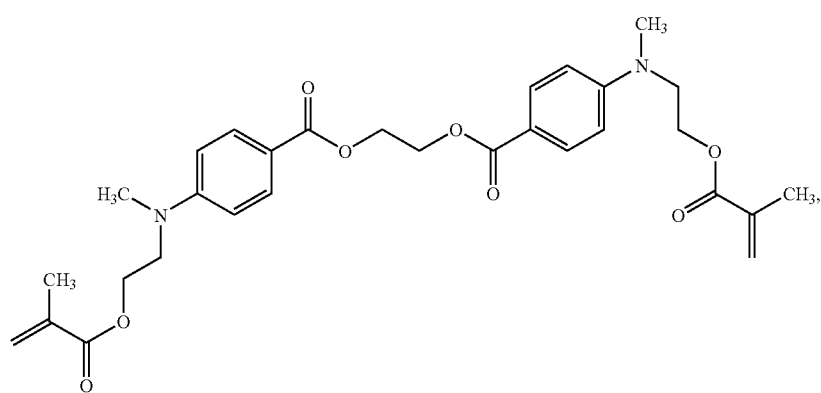
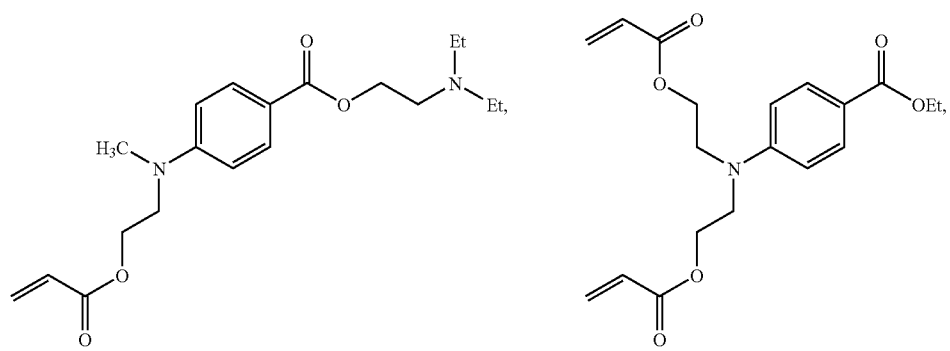
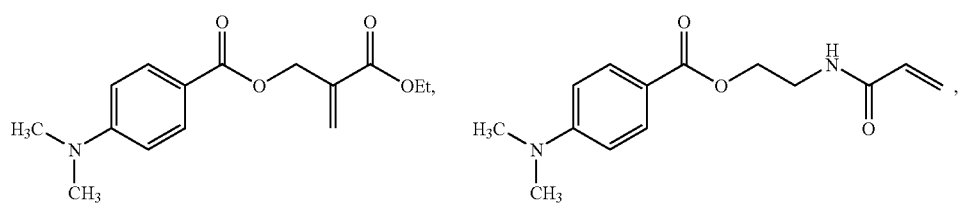
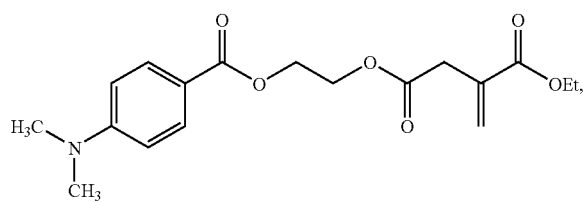
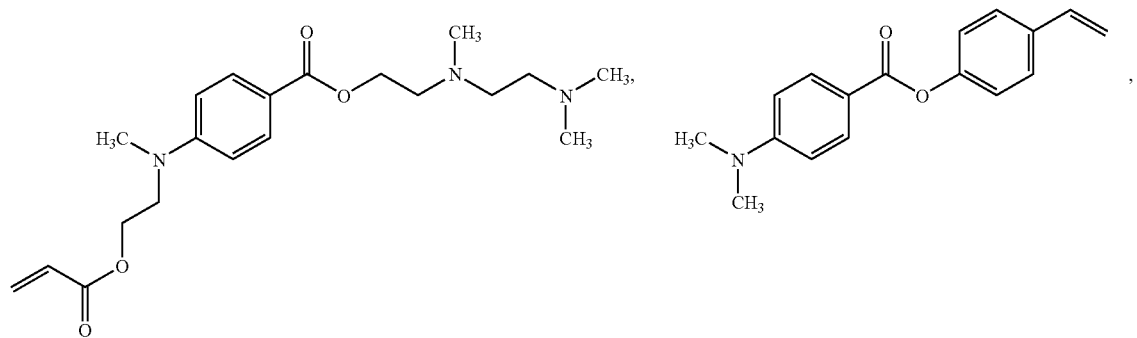

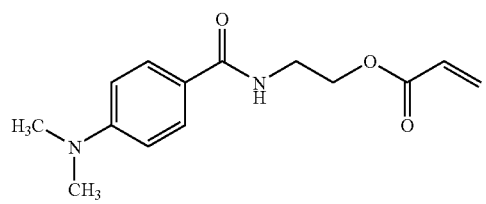 and 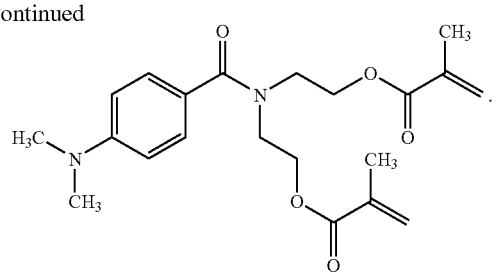

8. The liquid radiation curable composition according to claim 1, wherein the one or more photoinitiators are one or more of the polymerizable photoinitiators.

9. The liquid radiation curable composition according to claim 1, wherein the one or more photoinitiators includes the polymeric photoinitiator.

10. The liquid radiation curable composition according to claim 3, wherein the one or more photoinitiators are one or more of the polymerizable photoinitiators.

11. The liquid radiation curable composition according to claim 3, wherein the one or more photoinitiators includes the polymeric photoinitiator.

12. A radiation curable inkjet ink comprising:
the liquid radiation curable composition according to claim 1.

13. A method of using a liquid radiation curable composition, the method comprising the steps of:
providing the liquid radiation curable composition as defined by claim 1;
applying the liquid radiation curable composition to a package to reduce the amount of extractables in the package.

14. An inkjet printing process comprising the steps of:
providing at least one liquid radiation curable composition as defined by claim 1; and
applying to a substrate the at least one liquid radiation curable composition.

15. The inkjet printing process according to claim 14, wherein the liquid radiation curable composition applied to the substrate is a primer layer or an outermost topcoat layer.

16. The inkjet printing process according to claim 14, wherein the liquid radiation curable composition includes a white pigment.

17. The inkjet printing process according to claim 16, wherein the white pigment includes surface modified titanium dioxide.

18. A packaging material comprising:
a substrate having adhered to its surface a cured layer of the radiation curable inkjet ink as defined by claim 12.

19. The packaging material according to claim 18, wherein the substrate is selected from the group consisting of polyolefin, metallized polyethylene terephthalate, polystyrene, polycarbonate, polyurethane, polyesters, polyamide, polyimide, and metal.

* * * * *